United States Patent
Schick et al.

(10) Patent No.: US 8,904,718 B2
(45) Date of Patent: Dec. 9, 2014

(54) ROOF PANEL FOR SUPPORTING PV MODULES

(71) Applicant: Solarworld Industries America, Inc., Hillsboro, OR (US)

(72) Inventors: Matthias Schick, Bonn (DE); Harald Tebbe, Koenlgswinter (DE); Nathalie Kermelk, Ruppichteroth (DE); Manuel Dormagen, Mechernich (DE); Steven Meredith, Oxnard, CA (US)

(*) Notice: Subject to any disclaimer, the term of this patent is extended or adjusted under 35 U.S.C. 154(b) by 0 days.

(21) Appl. No.: 13/726,439

(22) Filed: Dec. 24, 2012

(65) Prior Publication Data

US 2013/0160382 A1 Jun. 27, 2013

Related U.S. Application Data

(60) Provisional application No. 61/579,736, filed on Dec. 23, 2011.

(51) Int. Cl.
| | |
|---|---|
| *E04H 14/00* | (2006.01) |
| *E04D 1/00* | (2006.01) |
| *F24J 2/46* | (2006.01) |
| *H01L 31/048* | (2014.01) |
| *F24J 2/52* | (2006.01) |

(52) U.S. Cl.
CPC ............... *F24J 2/5203* (2013.01); *Y02B 10/12* (2013.01); *H01L 31/0482* (2013.01); *Y02E 10/47* (2013.01); *Y02B 10/20* (2013.01); *F24J 2/5228* (2013.01)
USPC .............................. 52/173.3; 52/535; 126/623

(58) Field of Classification Search
CPC .............. H01L 31/042; H01L 31/0422; H01L 31/0428; H01L 31/048; H01L 31/0482; H01L 31/0483; H02S 10/00; H02S 20/00; Y02B 10/12
USPC ......... 52/173.3, 519, 535, 539; 126/621, 622, 126/623, 904; 136/244, 251
See application file for complete search history.

(56) References Cited

U.S. PATENT DOCUMENTS

| | | |
|---|---|---|
| 4,189,881 A | 2/1980 | Hawley |
| 4,886,554 A | 12/1989 | Woodring et al. |

(Continued)

FOREIGN PATENT DOCUMENTS

| | | |
|---|---|---|
| DE | 4408508 | 9/1995 |
| DE | 19851230 | 5/1999 |

(Continued)

OTHER PUBLICATIONS

Gumm, Michael, "Integrating Photovoltaics onto Building Envelope Surfaces", Corporate Roof Consultants, 2005.

(Continued)

*Primary Examiner* — Ryan Kwiecinski
(74) *Attorney, Agent, or Firm* — Oliff PLC

(57) ABSTRACT

A panel (10) that is a roof cover for a sloped roof and that also is a mounting system for an array of PV modules (132). The panels (10) define rails (22, 24, 28, 30) that interlock with grooves (46, 48, 124, 126) to secure adjacent panels in each row of the array. The modules (132) are supported by bosses (34, 120) that determine the height of the module array and avoid the interlocking structure between the modules.

28 Claims, 20 Drawing Sheets

(56) References Cited

U.S. PATENT DOCUMENTS

| | | | |
|---|---|---|---|
| 5,164,020 | A | 11/1992 | Wagner et al. |
| 5,316,592 | A | 5/1994 | Dinwoodie |
| 5,409,549 | A * | 4/1995 | Mori ............................ 136/244 |
| 5,524,401 | A * | 6/1996 | Ishikawa et al. ............. 52/173.3 |
| 5,768,831 | A | 6/1998 | Melchior |
| 5,935,343 | A * | 8/1999 | Hollick ........................ 136/246 |
| 6,065,256 | A | 5/2000 | Joko et al. |
| 6,201,179 | B1 * | 3/2001 | Dalacu ........................ 136/244 |
| 6,360,497 | B1 | 3/2002 | Nakazima et al. |
| 6,365,824 | B1 | 4/2002 | Nakazima et al. |
| 6,453,629 | B1 | 9/2002 | Nakazima et al. |
| 6,489,552 | B2 | 12/2002 | Yamawaki et al. |
| 6,501,013 | B1 | 12/2002 | Dinwoodie |
| 7,342,171 | B2 | 3/2008 | Khouri et al. |
| 7,469,508 | B2 * | 12/2008 | Ceria ........................... 52/173.3 |
| 7,509,775 | B2 | 3/2009 | Flaherty et al. |
| 8,186,111 | B2 * | 5/2012 | Flaherty et al. ............. 52/173.3 |
| 2008/0289679 | A1 | 11/2008 | Ressler |
| 2008/0302030 | A1 | 12/2008 | Stancel et al. |
| 2008/0313976 | A1 | 12/2008 | Allen |
| 2009/0064606 | A1 * | 3/2009 | Ceria ........................... 52/173.3 |
| 2009/0077907 | A1 * | 3/2009 | Flaherty et al. ............. 52/173.3 |
| 2010/0242381 | A1 | 9/2010 | Jenkins |
| 2010/0263661 | A1 * | 10/2010 | Faulkner ...................... 126/623 |
| 2010/0281794 | A1 | 11/2010 | Saillard |
| 2010/0313499 | A1 * | 12/2010 | Gangemi ..................... 52/173.3 |
| 2011/0138710 | A1 | 6/2011 | Reisdorf et al. |
| 2011/0239554 | A1 | 10/2011 | Tsuzuki et al. |
| 2011/0239555 | A1 | 10/2011 | Cook et al. |
| 2011/0302859 | A1 | 12/2011 | Crasnianski |
| 2011/0314752 | A1 | 12/2011 | Meier |
| 2011/0314753 | A1 | 12/2011 | Farmer et al. |
| 2013/0291456 | A1 * | 11/2013 | Desloover ................... 52/173.3 |

FOREIGN PATENT DOCUMENTS

| | | |
|---|---|---|
| DE | 19823356 | 11/1999 |
| DE | 202006012708 | 12/2006 |
| DE | 102005061709 | 3/2007 |
| DE | 102006038729 | 2/2008 |
| EP | 0949686 | 10/1999 |
| EP | 1170806 | 1/2002 |
| EP | 1296382 | 3/2003 |
| EP | 1310747 | 5/2003 |
| EP | 1985944 | 10/2008 |
| JP | 200017803 | 1/2000 |
| JP | 2002004527 | 1/2002 |
| JP | 2002322778 | 11/2002 |
| JP | 2002371678 | 12/2002 |
| JP | 2005226364 | 8/2005 |
| JP | 2011012484 | 1/2011 |
| WO | 9737387 | 10/1997 |

OTHER PUBLICATIONS

AEE Solar Snaprack Mounting System, Sunpower, http://www.ecovantageenergy.com/catalog/items/item1635.htm., Dec. 17, 2012.

O'Brien, Colleen, Roof-Mounted Solar Photovoltaic Arrays: Technical Issues for the Roofing Industry, Interface, pp. 13-22, Mar. 2006.

Press Release, Sunlink Product Change Simplifies System Installation, May 1, 2008.

SunPower, E18/225 AC Solar Panel Brochure, 2011.

SunPower Rooftop Solar Solutions, http://www.us.sunpowercorp.com/power-plant/products-services/rooftop-solutions/, Dec. 17, 2012.

SunPower Solar Energy Systems, http://www.us.sunpowercorp.com/homes/products-services/, Dec. 17, 2012.

SunPower Solar Energy Systems, http://www.us.sunpowercorp.com/homes/products-services/solar-panels/signature-black/, Dec. 17, 2012.

SunPower AC Solar Panels, http://www.us.sunpowercorp.com/homes/products-services/solar-panels/AC-home-solar-panel/, Dec. 17, 2012.

SunPower, Smart Mount Residential Mounting System Brochure, May 2009.

SunLink RMS Brochure, Sep. 2011.

SunLink RMS Assembly Instructions, Sep. 2011.

* cited by examiner

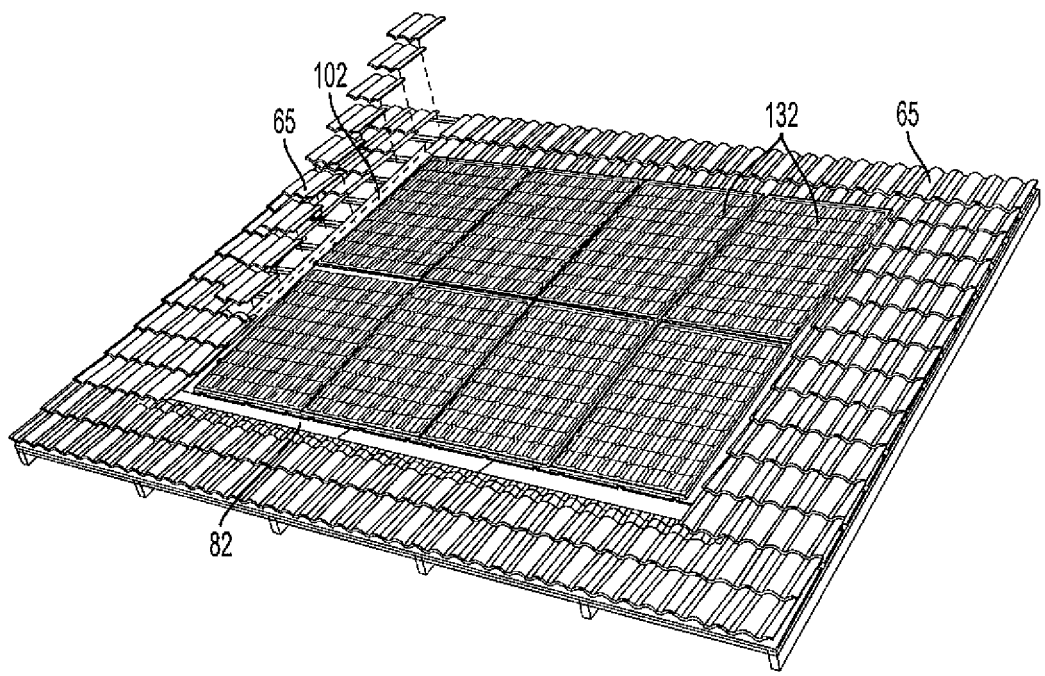
FIG. 18A
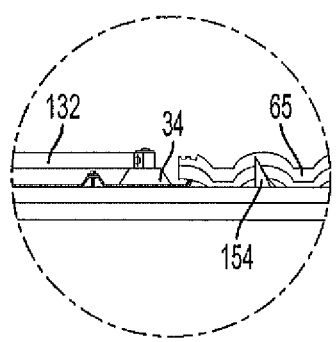 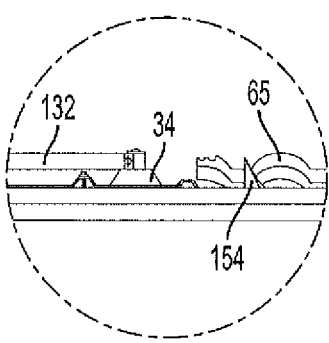
FIG. 18B        FIG. 18C

ROOF PANEL FOR SUPPORTING PV MODULES

BACKGROUND OF THE INVENTION

1. Field of the Invention

The presently disclosed invention relates to rooftop mounting systems for photovoltaic modules and, more particularly, mounting systems that serve as a roof covering.

2. Discussion of the Prior Art

A variety of mounting systems for photovoltaic modules are known in the prior art. In some cases, photovoltaic modules or "PV modules" serve as commercial power stations for generating commercial levels of electric power. In those power station systems, ground-level mountings systems support large numbers of photovoltaic modules that are arranged in a two dimensional array that covers a substantial area, often measured in units of acres. The mounting systems are relatively sophisticated. For example, they often control the orientation of the solar modules in two axes so that the modules track the position of the sun throughout the day in order to more effectively capture the solar energy.

Other, somewhat smaller systems are used in commercial or government installations. These systems are often dedicated to a particular commercial or governmental building or group of buildings such as a manufacturing facility or school. In many cases, such commercial systems are installed on rooftops that, due to the size of the building, are flat roofs. In some cases the mounting systems will cause the photovoltaic modules to track the position of the sun similar to power plant systems. More frequently, the commercial mounting systems hold the photovoltaic modules in a fixed angle and direction that is calculated to improve the efficiency of the modules in comparison to the achievable efficiency of a horizontal orientation. Such systems include the SunLink® RMS which is commercially available from SunLink Corporation of San Rafael, Calif.; and the SunPower® T5 Solar Roof Tile which is commercially available from SunPower Corporation.

In terms of the number of installations, residential applications are the most common use for photovoltaic modules that are capable of generating electrical power at levels suitable for household use. For reasons of user safety, product efficiency, protection of the power modules, and availability of space, photovoltaic modules that are used in residential applications are often mounted on the roof of the residence. Most residences are constructed with a peaked roof having a slope of as much as three to one. The mounting systems that have been developed for power generation stations and commercial installations are typically intended for horizontal surfaces and often are not directly applicable to sloped roofs. Moreover, those mounting systems are too massive and expensive for practical application on a residential, sloped roof.

Residential photovoltaic power systems generally incorporate the use of PV modules in the size of about three feet by five feet by two inches. The PV modules are comprised of a two dimensional array of crystalline photovoltaic cells or "PV cells," The PV cells do not produce sufficient power to make in commercially feasible to sell and install them as individual cells. However, when the PV cells are organized in sufficiently large arrays and electrically connected together in series and parallel circuits, they produce power levels that are suitable for use in many applications. The practical and economic considerations for manufacturing a suitable array of PV cells generally require an array of approximately five feet by three feet, depending on the efficiency of the PV cells that compose the array. Although some arrays are much bigger, particularly for use in power generation stations and for commercial applications, the PV modules that are used in residential applications are generally kept to the smallest commercially achievable size. That is because the smaller size favors a more flexible application of the PV module. By using smaller PV modules, the PV modules and arrays of PV modules can meet a broader range of limitations on available space and cost such as is typically encountered in residential applications.

Like power station PV systems and commercial PV systems, residential PV systems also have mounting systems that are known in the prior art. One commercial example of such designs is the SunTile™ PV roofing system by PowerLight Corporation. However, residential PV systems that were known in the prior art have had various disadvantages.

Prior residential mounting systems for PV modules generally fall into one of several categories. In one category, the PV module was simply supported directly on the conventional roof cover. It was known in the prior art that PV modules produce heat and so this type of roof mount typically included a thermal insulation barrier between the PV module and the roof cover so that the heat would not invade the house. However, it was also known in the prior art that PV modules become less efficient as their operating temperature increases. Therefore, it was seen that mounting systems that could better dissipate heat away from the PV module would be preferable.

In another category, the mounting system holds the PV modules apart from the roof cover so that air flow over both the front and back of the PV panel better dissipates thermal energy and tends to limit the temperature of the PV modules. Mounting systems in this category have a set of feet that are supported on top of a conventional roof covering such as asphalt or wood shingles. In those systems, the feet set atop the roof covering and support a framework of a size and geometry that corresponds to the desired size and shape of the array. The PV modules are secured to the frame to complete the array. An example of such systems is the Smart Mount™ system which is commercially available from SunPower Corporation.

Another category of residential mounting systems for PV modules also is built over a conventional roof cover such as a tile, asphalt, slate or other roofing material and also has a plurality of feet that support a framework that holds the array away from the surface of the roof cover. However, in this category the feet are not supported by the roof covering. Rather, they penetrate through the roof covering and are secured directly to the support frame of the roof. Mounting systems of this type tend to be more secure, but they also have a disadvantage in that they result in a number of penetrations through the roof covering. That makes them more difficult and expensive to install and also creates higher risk that water will penetrate the roof cover.

In another type of residential mounting design, the PV modules were arranged in columns that were oriented with the slope of the roof. Each PV module in the column partially overlapped the next lower module. This arrangement was thought to be advantageous in diverting water in the way of asphalt shingles. However, it was also disadvantageous in that a portion of each PV module was shielded from solar illumination so that the efficiency of the PV module array was materially compromised.

Still another type of PV mounting system is known as the PV shingle. Strictly speaking, this is not a mounting system but, rather, a modification of the PV device itself so that it can be applied somewhat differently than PV modules that are composed of crystalline PV cells. In a typical example of this system, the PV power source is constructed of amorphous silicon PV cells that are included in a relatively thin, physically flexible sheet that can be shaped in the general form of an asphalt shingle. Such "PV shingles" are nailed to the roof deck in an overlapping fashion similar to asphalt shingles. PV shingles are considered by some to be more aesthetically pleasing, but they also lack air flow to the underside of the PV shingle. The absence of air flow results in relatively high operating temperatures for the PV shingle. The higher temperatures tend to decrease efficiency of the PV shingles and to increase heat transfer from the roof into the house. In addition, PV shingles have an inherently lower efficiency than crystalline PV cells so that a physically larger array of PV shingles is required to generate a comparable amount of power.

It was observed in the prior art that a mounting system for PV modules that could serve the dual function of supporting the PV module array and also operating as a roof cover would be advantageous. Such a mounting system would avoid the disadvantages of PV shingles and also avoid the disadvantages of mounting systems that either stand on existing roof coverings or that are connected through the roof covering to the roof support frame. Such mounting systems would enjoy the greater efficiency of PV modules composed of crystalline PV cells and would also be securely fastened to the frame of the residence while avoiding additional maintenance and risk associated with multiple penetrations of the roof cover. However, combination roofing tile/PV module mounting systems known in the prior art had various disadvantages and difficulties.

As explained previously, it is desirable to keep the physical size of the PV module small due to reasons of cost and design flexibility. However, manufacturing constraints require a generally minimum size for the PV module. Thus, to avoid further compromise in design and cost flexibility, it is desirable that the unit size for a dual function roof cover/PV module mounting system be no larger than the PV module so that a one-to-one ratio is maintained. However, some prior art designs in which the PV module mounting system also served as a roof cover failed to keep a one-to-one ratio between the PV modules and the unit size of the mounting system. Such designs included roofing tile that accommodated multiple PV modules so as to compromise flexibility in the application of the PV module mounting system. In other cases, the tiles were smaller than the PV modules resulting in a corresponding multiplication of parts for the system and additional failure points for the roof cover.

Other styles of combination roof cover/PV module mounting systems provided roofing tiles that corresponded to the PV modules on a one-to-one basis, but they created a border around the perimeter of each PV module. Thus, when the roofing tiles were joined together, the PV modules in the array were separated laterally from each other. Solar illumination of that portion of the array composed of the exposed portions of the tiles did not contribute to any power generation. In a somewhat converse design, other roof cover/PV module mounting systems wherein roofing tiles corresponded to the PV modules on a one-to-one basis provided an air gap between the PV modules. There also, solar illumination of the array was partially lost to the gaps between the PV modules and did not contribute to any power generation. Accordingly, a PV module array of a given size with either design of roof cover/mounting system was less efficient than a PV module array of the equivalent size wherein the PV modules were fitted closely together to form a planar illumination surface.

Still other styles of PV module mounting designs have provided a roof tile that supports a PV module on a one-to-one ratio with the PV panels fitted closely together. However, those systems supported the PV module at periodic locations that did not admit to interlocking engagement of the tiles in a way that the PV modules were supported by the tile directly under the PV module and by adjacent tiles. This limitation against integrating the tiles created a risk of water leakage between the tiles and required heavier gauge tiles to achieve mechanical strength that would be comparable to a system with more sophisticated interlocking capability.

SUMMARY OF THE INVENTION

In accordance with the presently disclosed invention, a panel serves the dual purpose of providing a integral roof covering for sloped roofs and also a mounting structure for an array of PV modules. Each panel has a first side that defines a plurality of rails and at least one boss that has a mounting surface for vertically supporting the PV modules. Each panel also has an opposite side that defines a plurality of grooves. The rails and grooves of the panel are spaced such that when two of the panels are placed in a side-to-side overlapping orientation, some of the rails of one panel coincide with a corresponding number of the grooves in the other panel. The profile of the rails corresponds to the profile of the grooves such that the rails engage the grooves to secure the two panels together. A plurality of panels are connected in this way to assemble a row of panels. A plurality of rows of panels are arranged in columns to assemble an array of rows and columns of panels.

The boss on each panel is spaced with respect to the rails and grooves such that when adjacent panels that are secured together, bosses of respective panels are spaced apart such that the mounting surface of each boss is positioned to support one side of a PV module. The boss of the module is higher than the rails so that a PV module that is placed on the mounting surfaces of the bosses is vertically supported by the bosses and is not in contact with the rails.

The bosses maintain the PV module apart from the panel to define an airflow pathway between the PV module and the panel. The panel may include a micro-inverter that is connected to the panel. The first side of the panel may also include an additional boss and the second side of the cavity may include a cavity that corresponds to the boss so that panels can be secured together with the boss of one panel stacking on the boss of the adjacent panel.

When the panels are connected together in rows and the rows are arranged vertically in columns, the panels define an array of rows and columns. A number of PV modules that corresponds to the same number of panels can be arranged one-to-one on respective panels to establish a corresponding array of PV modules. The support surface of each boss is located adjacent to an edge of the panel such that a portion of one support surface supports one PV module and another portion of the same support surface supports an adjacent PV module such that the PV modules can be arranged in close proximity to each other. The support surfaces are essentially planer so that the illumination surfaces of adjacent PV modules are aligned in the same plane. Since the panels are an integral part of the roof cover and are not built on top of existing roof cover, the PV module array has a lower height relative to the adjacent conventional roof cover to improve the aesthetics of the PV module array.

The panel array can be combined with a column of sheeting pieces on one side of the array to provide a boss at one end of each row that cooperates with the boss of the adjacent module to support the PV modules on the same side of the PV module array. Another column of sheeting pieces can be provided on the opposite side of the array and cooperates with adjacent modules to provide an exposed panel surface on the same side of the array. Also, eaves flashing can be added to the bottom of the panel array to bridge the separation between the bottom of the panel array and the adjoining conventional roof cover. A ventilation grille can be added to the top of the panel to better control air flow around the PV module array. Also, an elastic seal can be used in cooperation with adjacent roofing tiles to adjust the elevation of the roofing tiles to make them more equivalent to the elevation of the PV modules and improve the aesthetics of the PV module array.

The method of installing the panel array provides that the panels can be attached to the support frame for the roof in serial fashion to install each row of panels. Columns of panels are built by repeating the same steps for building a row to add additional, higher rows of panels. When the panel array of rows and columns has been completed, the PV modules are added to the panels on a one-to-one basis. The PV modules are secured to the bosses as they are added to the panel array. To improve efficiency of the PV module array, the panels are positioned close together and create a flat illumination surface.

Other objects and advantages of the presently disclosed invention will become apparent to those skilled in the art as the description of a presently disclosed embodiment of the invention and a method for making the invention proceed.

BRIEF DESCRIPTION OF THE DRAWINGS

Several presently preferred embodiments are shown and described herein in connection with the accompanying drawings wherein:

FIG. 18A is a partially exploded perspective view of the disclosed embodiment of the system for mounting a PV module array as shown in 17A;

FIG. 18B shows an enlarged cross-section of a portion of FIG. 18A;

FIG. 18C shows an enlarged cross-section of a portion of FIG. 18A;

DESCRIPTION OF PRESENTLY PREFERRED EMBODIMENTS

Figure 1:
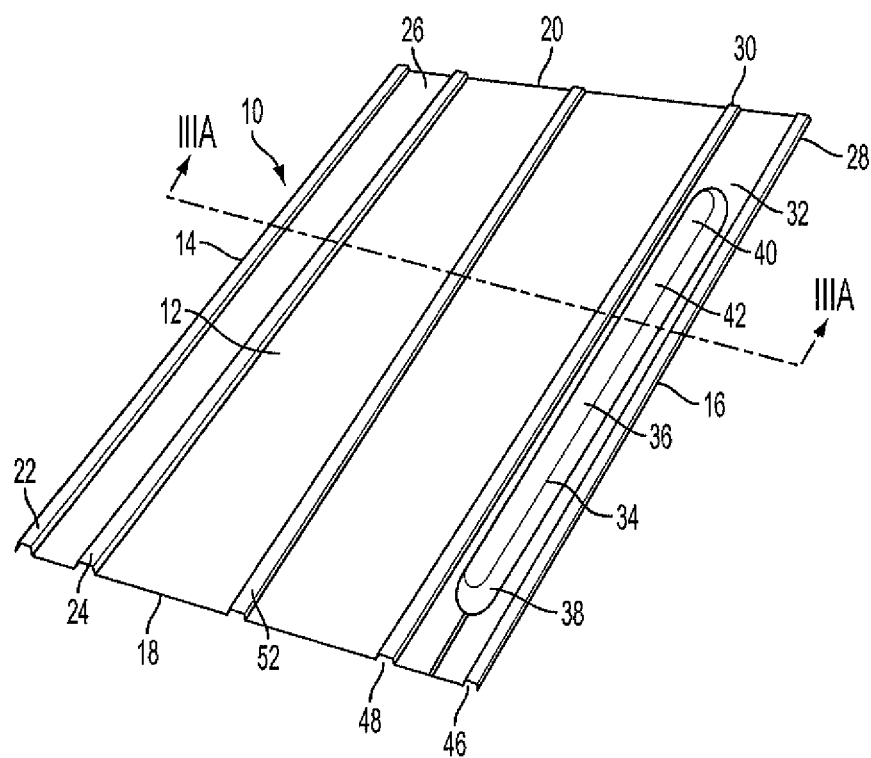
FIG. 1 is a perspective view of a panel for supporting a PV module in accordance with the disclosed embodiment.
Figure 2:
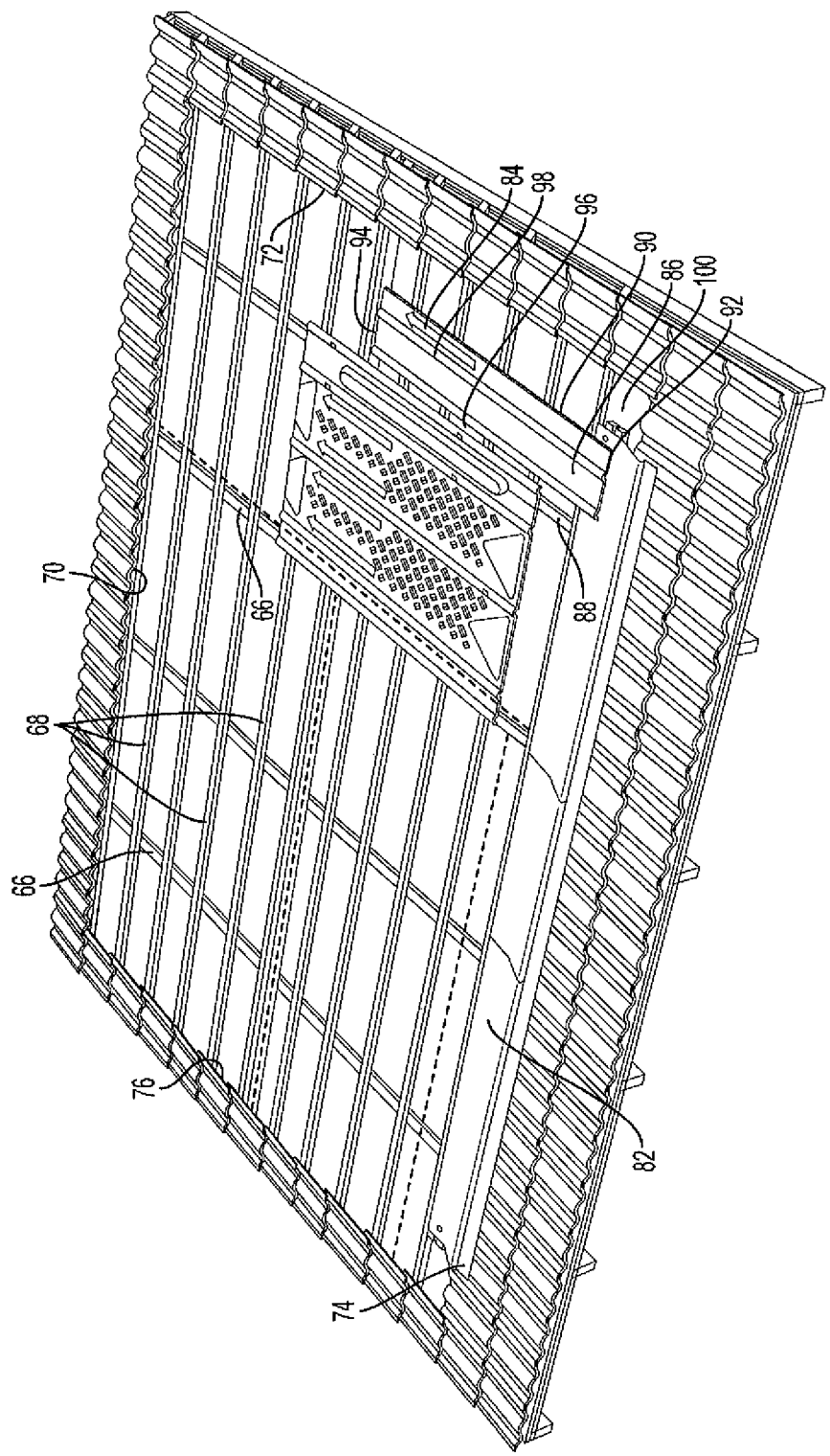
FIG. 2 is a partially exploded view of portions of the disclosed embodiment of a system for mounting a PV module array shown in perspective and including eaves flashing, a sheeting piece, and a panel such as shown in FIG. 1.
Figure 3:
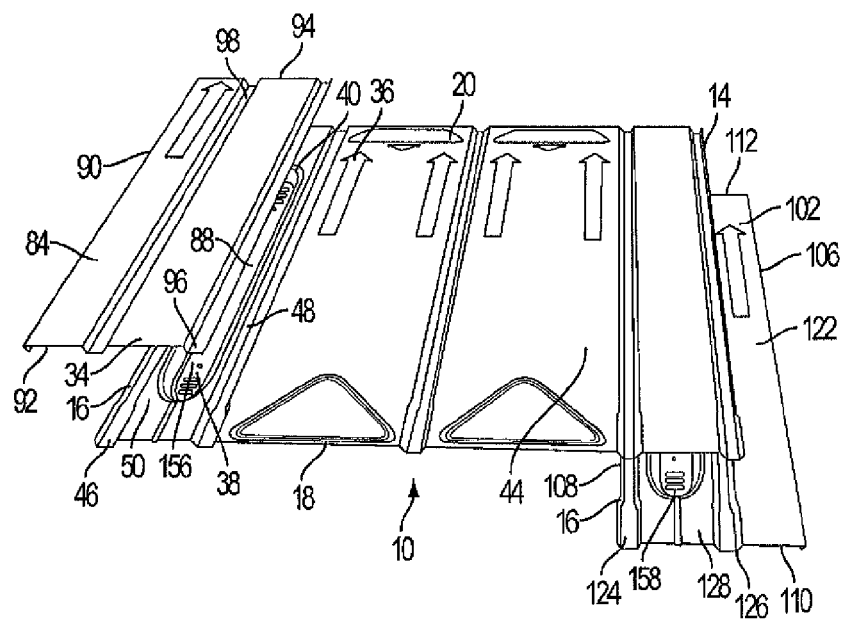
FIG. 3 is a perspective of the opposite side of the panel that is shown in FIG. 1 in combination with sheeting pieces that are used in the disclosed embodiment of a system for mounting a PV module array.

As particularly shown in FIGS. 1 and 3, disclosed herein is a panel 10 that serves as a roof cover that can be used in combination with conventional roof coverings such as asphalt shingles, tiles, slate and other materials to provide an integrated roof cover that supports an array of PV modules. The PV module array is defined as the organization of PV modules in one of more lateral rows and one or more vertical columns.

The PV module array is designed in accordance with the power requirements for the application, the available roof area, the orientation of the roof, requirements of local building codes, and other factors concerning the design of PV module arrays as is known in the art.

The panel 10 includes a first side 12 that is defined between a first edge 14 and a second edge 16 that are oppositely disposed from each other on panel 10. The first side 12 of panel 10 is also defined between a third edge 18 and a fourth edge 20 that are also oppositely disposed from each other. First side 12 is located between first edge 14 and second edge 16 and between third edge 18 and fourth edge 20.

The first side 12 of panel 10 defines several features including a first rail 22 that is located adjacent to first edge 14 and that extends between third edge 18 and fourth edge 20, up to and including those edges. The first side 12 of panel 10 also defines a second rail 24 that is located between first rail 22 and the second edge 16 and that extends between third edge 18 and fourth edge 20, up to and including those edges. Second rail 24 is spaced apart from the first rail 22 and oriented on first side 12 in a direction parallel to the first rail 22. The area of first side 12 located between the first rail 22 and the second rail 24 defines a first overlap are 26.

The first side 12 of panel 10 also defines a third rail 28 that is located adjacent to the second edge 16 and that extends between third edge 18 and fourth edge 20, up to and including those edges. Also, first side 12 defines a fourth rail 30 that is located on first side 12 between third rail 28 and second rail 24 and that extends between third edge 18 and fourth edge 20 up to and including those edges. Fourth rail 30 is spaced apart on first side 12 from third rail 28 and oriented on first side 12 in a direction parallel to third rail 28. First side 12 defines a second overlap area 32 between third rail 28 and fourth rail 30.

Figure 3A:
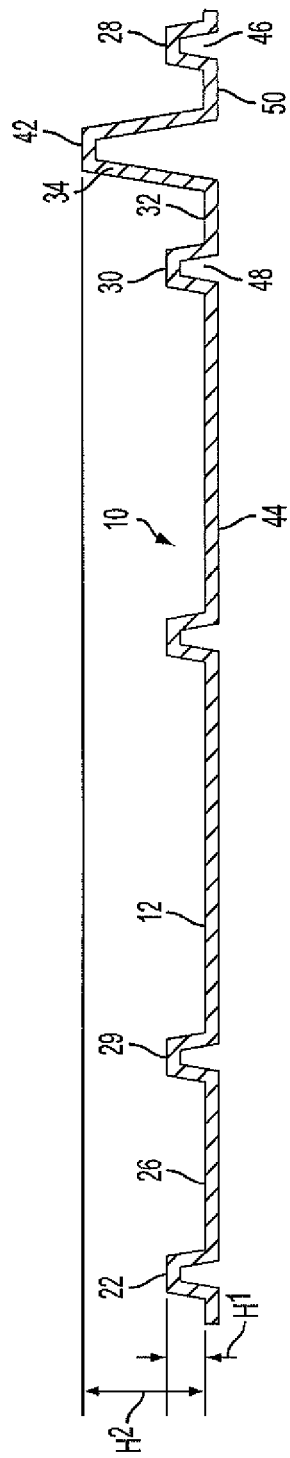
FIG. 3A is a cross-sectional view of the panel shown in FIG. 1 taken along the lines IIIA-IIIA of FIG. 1.
Figure 3B:
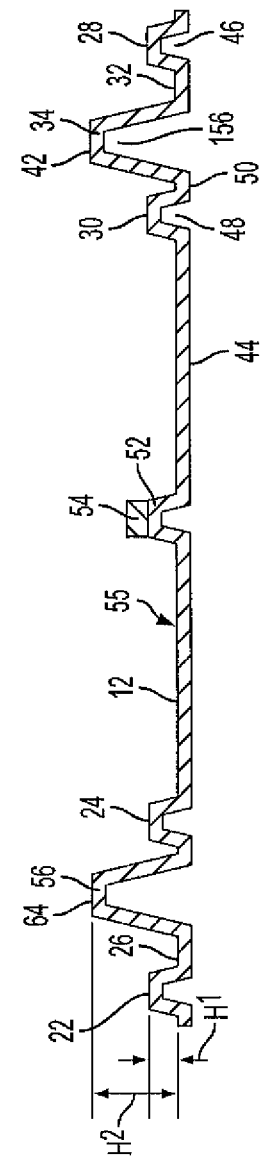
FIG. 3B is a cross-sectional view of the panel shown in FIG. 19 taken along the lines IIIB-IIIB of FIG. 19
Figure 4:
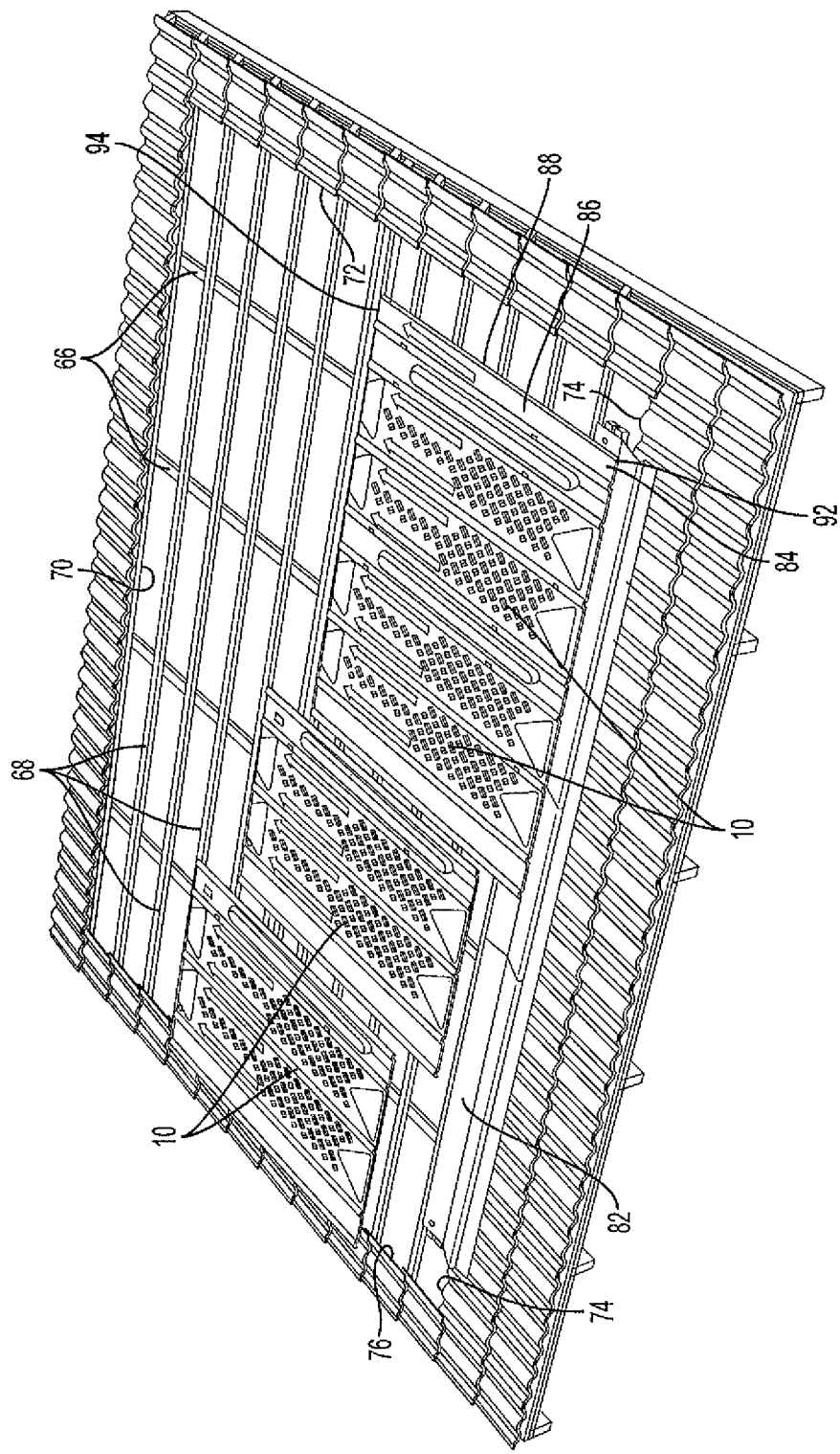
FIG. 4 is a partially exploded view of portions of the disclosed embodiment of a system for mounting a PV module array as shown in FIG. 2 and further including additional panels.
Figure 5:
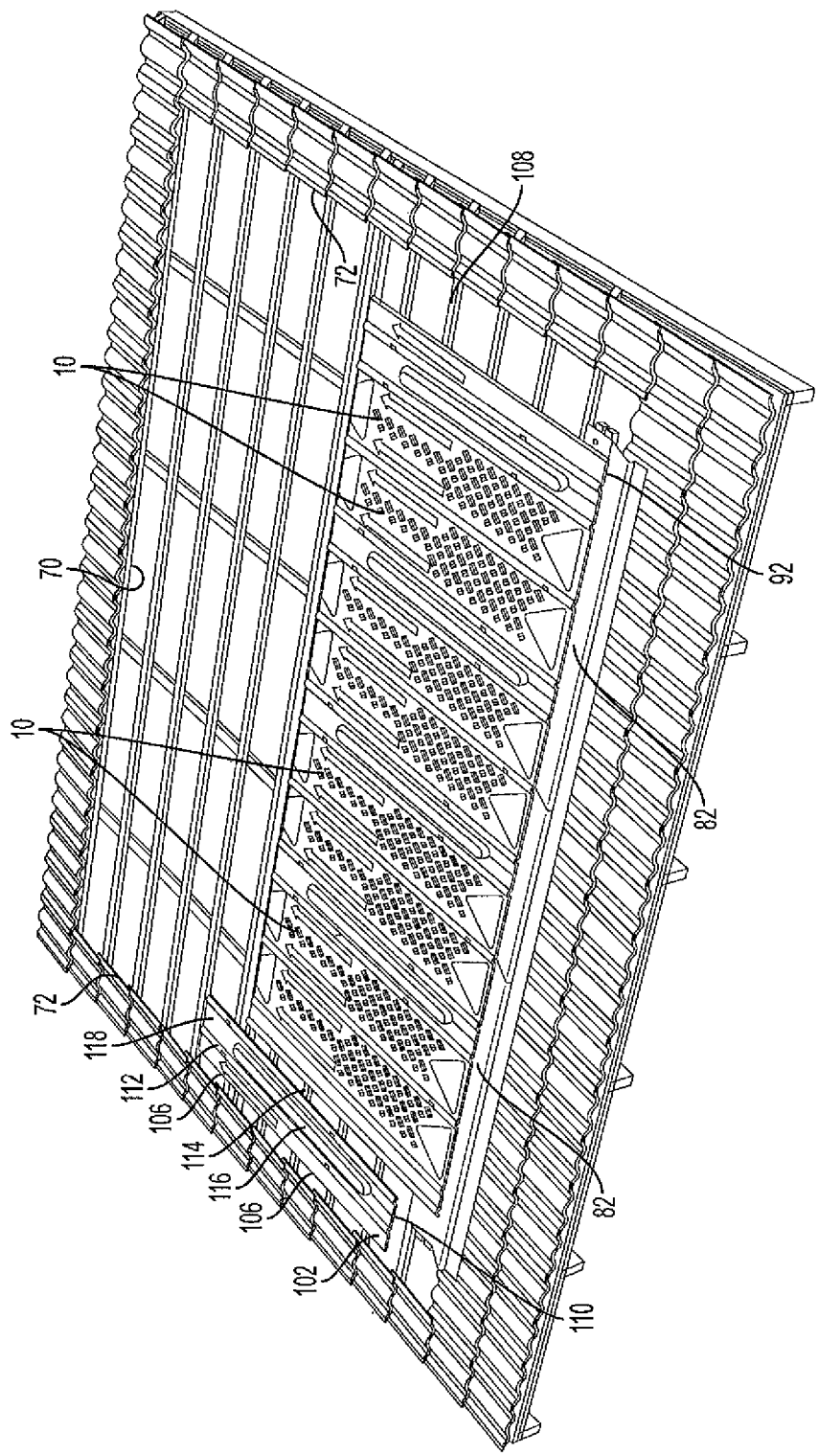
FIG. 5 is a partially exploded view of portions of the disclosed embodiment of the system for mounting a PV module array as shown in FIG. 4 and further including additional panels and a second sheeting piece.

As particularly shown in FIG. 3A, each cross-section, or profile, of rails 22, 24, 28 and 30 defines a trapezoidal geometry with the base of the trapezoid 31a in the plane of the adjacent portions of side 12 and the top of the trapezoid 31b standing above the adjacent portions of first side 12. The dimension in the normal direction between the base 31a and the respective top 31b of the trapezoid formed by each rail 22, 24, 28 and 30 is defined as the height $H^1$ of the rail.

A boss 34 is also located on first side 12 between third rail 28 and fourth rail 30 and between third edge 18 and fourth edge 20, but boss 34 does not extend as far as edges 18 and 20. Boss 34 has an elongated shape that is generally parallel to the longitudinal direction of rails 22, 24, 28 and 30 with a longitudinal dimension between third edge 18 and fourth edge 20 and a lateral dimension between the third rail 28 and the fourth rail 30. The lateral dimension is normal to the longitudinal dimension and the longitudinal dimension is greater than the lateral dimension.

As particularly shown in FIGS. 1, 3 and 3A, the geometry of boss 34 is a generally trapezoidal body 36 that is rounded to an elliptical shape on each end 38, 40. The cross-section or profile of boss 34 defines a trapezoid geometry with the base of the trapezoid 37a in the plane of the adjacent portions of first side 12 and the top of the trapezoid 37b standing above the adjacent portions of first side 12. The dimension in the normal direction between the base 37a and top 37b of the trapezoid formed by boss 34 is defined as the height $H^2$ of the boss. As shown in the drawings, the height $H^2$ of boss 34 is greater than the height $H^1$ of rails 22, 24, 28 and 30. As further explained in connection with other embodiments of the invention disclosed herein, the top of boss 34 defines a support surface 34 for the vertical support of a solar module that is paired with panel 10. Because boss 34 is higher than rails 22, 24, 28 and 30, boss 34 can support the PV module above and without interference from rails 22, 24, 28 and 30.

Panel 10 further includes a second side 44 that is oppositely disposed on panel 10 from first side 12. Second side 44 is defined between first edge 14 and second edge 16 and located between first edge 14 and second edge 16. Second side 44 is also defined between third edge 18 and fourth edge 20 and located between third edge 18 and fourth edge 20.

Second side 44 defines a first groove 46 that is located on second side 44 adjacent to second edge 16. First groove 46 extends from the third edge 18 to the fourth edge 20 up to and including those edges. First groove 46 is located on panel 10 oppositely from third rail 28 and has a profile that is complementary to the profile of third rail 28.

Second side 44 also defines a second groove 48 that is located on second side 44 between first groove 46 and first edge 14. Second groove extends from the third edge 18 to the fourth edge 20 and is located on panel 10 oppositely from fourth rail 30. Second groove 48 is spaced apart from first groove 46 and oriented on second side 44 in a direction that is parallel to the direction of first groove 46 to define a third overlap area 50 between first groove 46 and second groove 48. Second groove 48 has a profile that is complementary to the profile of fourth rail 30.

As hereafter more fully explained, the complementary profiles of third rail 28 and first groove 46 and fourth rail 30 and second groove 48 facilitate the engagement of adjacent panels 10 when the panels are arranged in an array to support the PV module array. The trapezoidal profile of rails 18 and 20 and of grooves 46 and 48 is preferred because it allows easy engagement of the respective rails and grooves.

Preferably, panel 10 is molded of a thermosetting material to accurately and consistently make panel 10 within acceptable tolerances so that adjacent panels will quickly and reliably engage each other as is hereafter more fully described. Also preferable, panel 10 includes a fifth rail 52 that is located on the first side 12 of panel 10 and between and parallel to the second rail 24 and the fourth rail 30. Fifth rail 52 extends between third edge 18 and fourth edge 20 and includes those edges. Fifth rail 52 helps to provide additional mechanical strength to panel 10 so that the panel and be molded of thinner gauge material and thereby achieve the same degree of mechanical strength for panel 10 as a heavier gauge panel without incurring the additional cost and weight of using additional material in panel 10.

Figure 19:
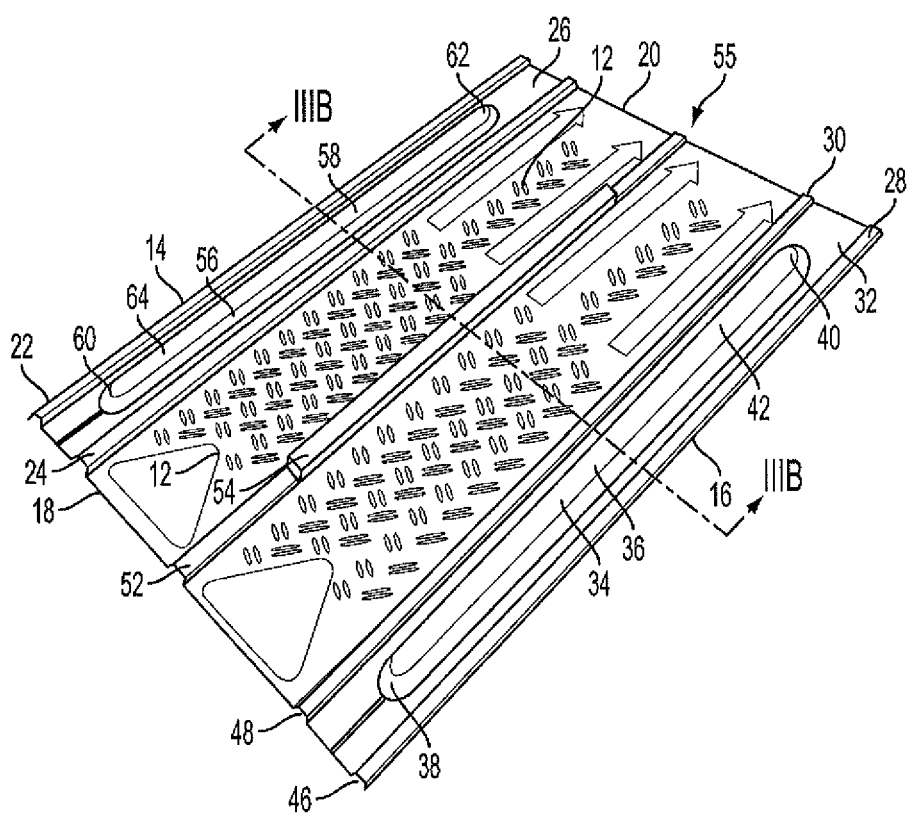
FIG. 19 is a perspective view of an alternative embodiment of the panel that is shown in FIG. 1.

In some cases, panel 10 can further include a steel bar that is secured to fifth rail 52 to still further strengthen the panel 10. An example of such a bar is shown in FIG. 19 which displays an alternative embodiment of panel 10 wherein like parts are given the same reference characters as in FIGS. 1, 3 and 3A. In FIG. 19, a bar 54 is added to a fifth rail 52.

FIG. 19 shows a panel 55 that is equivalent to panel 10 except that panel 55 includes a second boss 56 that is located on the first side 12 of panel 55 between the first rail 22 and the second rail 24 and between third edge 18 and fourth edge 20, but second boss 56 does not extend as far as edges 18 and 20. Second boss 56 is essentially the same construction as boss 34. Boss 56 has an elongated shape that is generally parallel to the longitudinal direction of rails 22, 24, 28 and 30 with a longitudinal dimension between third edge 18 and fourth edge 20 being longer than the normal, lateral dimension between the first rail 22 and second rail 24.

As shown in FIG. 19, the geometry of second boss 56 is a generally trapezoidal body 58 that is rounded to an elliptical shape on each end 60, 62. The cross-section or profile of second boss 56 defines a trapezoid geometry with the base of the trapezoid 57a is in the plane of the adjacent portions of first side 12 and the top of the trapezoid 57b stands above the adjacent portions of first side 12. The dimension in the normal direction between the base 57a and top 57b of the trapezoid formed by second boss 56 is defined as the height $H^2$ of the boss. As shown in the drawings, the height $H^2$ of second boss 56 is the same as the height of boss 34 and greater than the height $H^1$ of rails 22, 24, 28 and 30. As further explained in connection with other embodiments of the invention disclosed herein, the top 57b of second boss 56 defines a support surface 64 for the vertical support of a solar module that is paired with panel 10. Because boss 34 and second boss 56 are both higher than rails 22, 24, 28 and 30, boss 34 and second boss 56 can cooperate to support a PV module above the rails without interference from rails 22, 24, 28 and 30.

Figure 20:
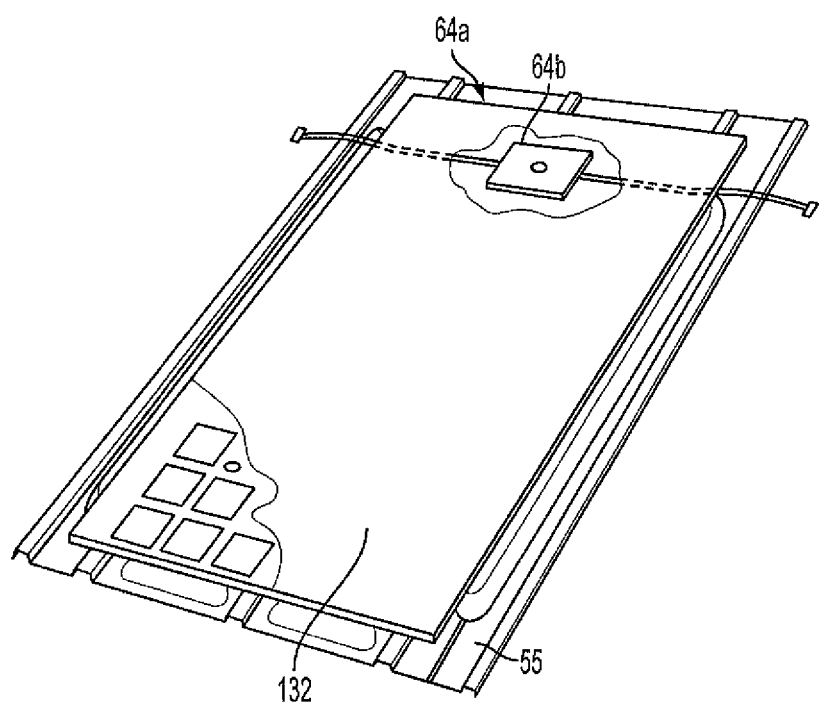
FIG. 20 is a perspective view of another alternative embodiment of the panel that is shown in FIG. 19 together with a PV module mounted thereon and further including a micro-inverter.

Another embodiment of the disclosed invention is shown in FIG. 20 wherein like parts are assigned the same reference characters as in FIGS. 1, 3 and 3A. FIG. 20 shows a panel 64a that has the same construction as panel 55 except that panel 64a further includes a micro-inverter 64b that is mounted to the panel. The panel 64a in FIG. 20 also includes a PV module 132 that is mounted on the panel. Portions of PV module 132 are broken away to better disclose the structure of the disclosed invention. Micro-inverter 64b is electrically connected to the output wiring of a PV module 132 that is mounted on panel 64a. Micro-inverter 64b produces an AC power output in response to the DC power that is provided from the PV cells of the PV module 132.

Panel 64a has several advantages. First, it affords still greater flexibility and choice in the design and application of PV module arrays. Because the PV module array produces a DC electrical output, the output has to be converted to an AC signal before the power can be used in the residence or transmitted to a commercial power grid. Frequently, DC/AC power conversion is accomplished for the entire PV module array in a central inverter that is located nearby, but remote from, the PV module array. Such central inverters are generally sized such they require a minimum of approximately nine to twelve PV modules to operate efficiently. However, for reasons of space, cost or other limitations, PV module arrays sometimes are required to be smaller than the minimum size required for the central inverter. Thus, those applications often could not be satisfied. The micro-inverter 64b in panel 64a is much smaller than typical central inverters. Micro-inverter 64b is sized to work with only a single PV module. Thus, panel 64a can used in arrays of less than the minimum number of PV modules that are required by central inverters and satisfies the need for more flexibility to design and use smaller PV module arrays.

Another advantage of panel 64a is that it provides AC power directly from the PV panel 64a. This makes the PV module array easier to install because many installers are more familiar with the equipment and practices for installing AC circuitry than for DC circuitry. In addition, the use of panels 64a makes the operation of the system more efficient because it avoids the need to transmit DC power from the location of the PV module to a central inverter at a remote location. Instead, an AC power signal is used and the line losses normally associated with the transmission of DC power are avoided.

Still another advantage of panel 64a is that it is somewhat safer. Central inverters are usually located where it is not inconvenient to access them for reasons of service or inspection. This means that the DC power generated from the PV module array is carried off of the roof to the location of the central inverter. With panel 64a, all DC power remains on the roof of the building and highly inaccessible. Thus, the potential exposure to DC power is greatly reduced.

In addition, micro-inverter 64b obtains optimum power by performing maximum power point tracking for the respective PV module that is mounted on panel 64a. The maximum power point tracking of micro-inverter 64b controls impedance to maximize power output from the module.

Also, panel 64a is commercially advantageous in that it can be sold with the PV module 132 already mounted thereon. Thus, the panel 64a can be packaged with a pre-mounted PV module to provide a device that produces AC electrical current in response to solar illumination without the need for special engineering or complicated power conversion circuitry.

A system that incorporates panel 10, panel 55 or panel 64a to provide a dual purpose roof cover/PV module mounting system and a method for constructing such a system is further shown and described in connection with FIGS. 2-18.

FIGS. 2-18 illustrate the disclosed system as it is being installed on a sloped roof of a residential building. The system provides a new roof cover in combination with a PV module array for a substantial portion of the sloped surface. The balance of the sloped surface is covered by conventional ceramic roofing tiles 65. However, the disclosed invention is not limited to use with a particular conventional roof cover and alternative conventional roof covers such as asbestos shingles or slate tiles also could be used. In the example of the disclosed embodiment, a two-dimensional PV module array comprised of two rows and four columns is depicted although other arrays of different sizes also could be depicted without altering the scope of the disclosed system or method. Accordingly, the system and method of the presently disclosed embodiment will provide a two dimensional array of panels 10, 55, or 64a comprised of two rows and four columns that provide a roof cover for the area of exposed roof support structure and a mounting system for the PV module array.

To install the disclosed roof cover/PV module monitoring system, the appropriate size and geometry for the PV module array is determined according to power requirements, building orientation, local building codes and other factors as known to those skilled in the art. Then, a designated portion of the roof support frame corresponding to that size and geometry is exposed. In existing housing this would require removing the appropriate portion of existing roof cover. In new construction, this would simply mean not adding the conventional roof cover to the designated portion of the roof. In FIGS. 2-18, the portion of the sloped roof that is designated to receive the roof system herein disclosed is identified by the area of exposed joists 66 and cross joists 68 that is bounded by edges 70, 72, 74 and 76 of the conventional roof tiles 65. As referred to herein, edge 70 is the upper edge of roof tiles 65 nearest the peak 78 of the roof. Edge 74 is the lower edge of the roof tiles 65 nearest the eaves 80. Edges 72 and 76 are sloped edges on the lateral sides of the area of exposed joists and cross joists.

Referring particularly to FIGS. 2-5, installation of the disclosed system is initiated with the installation of eaves sheeting 82 that is secured to the cross battens or other portions of the roof support frame adjacent the lower edge 74 of the roof tiles 65. Eaves sheeting 82 is used to correct for marginal differences between the unit size of the panels 10 and the unit size for the conventional roof—i.e. the size of the individual shingle, slate tile, ceramic tile, and the like. Eaves sheeting 82 covers the spacing between the edge 18 of panels 10 (yet to be installed) and the lower edge 74 of the roof tiles to convey water that flows down-slope from the array of panels 10.

With eaves sheeting 82 secured, a first sheeting piece 84 is secured to cross-joists 68 of the roofing support frame. First sheeting piece 84 includes a first side 86 that is defined between a first edge 88 and a second edge 90 that are oppositely disposed from each other with first side 86 being disposed between the first and second edges. The first side 86 of sheeting piece 84 is also defined between a third edge 92 and a fourth edge 94 that are also oppositely disposed from each other with first side 86 being located between the third edge 92 and the fourth edge 94. First sheeting piece 84 is secured to the roof frame in the orientation such that third edge 92 extends over the top of eaves sheeting 82, fourth edge 94 is the edge of first sheeting piece 84 that is closest to the edge 70 of the roof cover, first edge 88 closest to the edge 76 of the roof cover, and second edge 90 closest to edge 72 of the roof cover.

The first side 86 of first sheeting piece 84 defines a first rail 96 that is located adjacent the first edge 88 and a second rail 98 that is spaced apart from and parallel to first rail 96 to define an overlap area 100 between the first rail 96 and second rail 98. First rail 96 has a profile that corresponds to the profile of second groove 48 of panel 10 and second rail 98 has a profile that corresponds to the profile of first groove 46. Preferably, the profile of first rail 96 and second rail 98 is in the form of a trapezoid as previously shown and described in connection with FIGS. 1, 3 and 3A.

First rail 96 and second rail 98 are spaced apart on side 86 of first sheeting piece 84 by a dimension that is equivalent to the dimension by which second groove 48 is spaced apart from first groove 46 on the second side 44 of panel 10. In this way, when panel 10 is oriented on the roof frame with third edge 18 extending over eaves sheeting 82, fourth edge 20 the closest edge to the edge 70 of the roof cover and the first side 12 of panel 10 facing upwardly, panel 10 can be located over first sheeting piece 84 so that first rail 96 engages second groove 48, second rail 98 engages first groove 46, and third overlap area 50 of panel 10 opposes the overlap area 100 of first sheeting piece 84. In this way, panel 10 securely engages with first sheeting piece 84.

Thereafter, a second panel 10 is added to the panel array by orienting the second panel 10 in the same orientation on the roof frame as the first panel 10. For each panel 10, third rail 28 and fourth rail 30 are spaced apart on side 12 by a dimension that is equivalent to the dimension by which second groove 48 is spaced apart from first groove 46 on the second side 44 of panel 10. In this way, when panel 10 is oriented on the roof frame with third edge 18 extending over eaves sheeting 82, fourth edge 20 the closest edge to the edge 70 of the roof cover, and the first side 12 of panel 10 facing upwardly, the newly added panel 10 can be located over the adjacent panel 10 so that first rail 22 and second rail 24 of one panel 10 engage second groove 48 and first groove 46 respectively of the adjacent panel 10 and first overlap area 26 of the one panel 10 opposes the third overlap area 50 of the newly added adjacent panel 10. Thereafter, the same process is repeated with additional panels 10 to add panels to the row of the panel array until the row has a panel 10 for each column that is required for the array.

When all the panels 10 for a complete compliment of a row of panels have been added, a second sheeting piece 102 is secured to cross-joists 68 of the roofing support frame. Second sheeting piece 102 includes a first side 104 that is defined between a first edge 106 and a second edge 108 that are oppositely disposed from each other with first side 104 being disposed between the first and second edges. The first side 104 of second sheeting piece 102 is also defined between a third edge 110 and a fourth edge 112 that are also oppositely disposed from each other with first side 104 being located between the third edge 110 and the fourth edge 112. Second sheeting piece 102 is secured to the roof frame in the orientation such that third edge 110 extends over the top of eaves sheeting 82, fourth edge 112 is the edge of second sheeting piece 102 that is closest to the edge 70 of the roof cover, first edge 106 closest to the edge 76 of the roof cover, and second edge 108 closest to edge 72 of the roof cover.

The first side 104 of second sheeting piece 102 defines a first rail 114 that is located adjacent the second edge 108 and a second rail 116 that is spaced apart from and parallel to first rail 114 to define an overlap area 118 between the first rail 114 and second rail 116. A boss 120 is also located on first side 104 between first rail 114 and second rail 116 and between third edge 110 and fourth edge 112, but boss 120 does not extend as far as edges 110 and 112. Boss 120 is essentially the same size and shape as boss 34 which was previously described. Boss 120 has an elongated shape that is generally parallel to the longitudinal direction of rails 114 and 116 with a longitudinal dimension between third edge 110 and fourth edge 112 and a lateral dimension between the first rail 114 and the second rail 116.

Similar to the geometry of boss 34, boss 120 is a generally trapezoidal body 136 that is rounded to an elliptical shape on each end 138, 140. The cross-section or profile of boss 136 defines a trapezoid geometry with the base of the trapezoid 141$a$ in the plane of the adjacent portions of first side 104 and the top of the trapezoid 141$b$ standing above the adjacent portions of first side 104. The dimension in the normal direction between the base 141$a$ and top 141$b$ of the trapezoid formed by boss 120 is defined as the height $H^2$ of the boss. As shown in the drawings, the height $H^2$ of boss 120 is greater than the height $H^1$ of rails 114 and 166. Similar to the boss 30, the top of boss 120 defines a support surface 142 for the vertical support of a solar module that is paired with second sheeting piece 102 in combination with the boss 34 of the adjacent panel 10. The longitudinal dimension is greater than and normal to the lateral dimension. Because boss 120 is higher than rails 114 and 116, boss 120 can support the PV module above and without interference from rails 114 and 116.

Second sheeting piece 102 further includes a second side 122 that is oppositely disposed on second sheeting piece 102 from first side 104. Second side 122 is defined between first edge 106 and second edge 108 and located between first edge 106 and second edge 108. Second side 122 is also defined between third edge 110 and fourth edge 112 and located between third edge 110 and fourth edge 112.

Second side 122 defines a first groove 124 that is located on second side 122 adjacent to second edge 108. First groove 124 extends from the third edge 110 to the fourth edge 112 up to and including those edges. First groove 124 is located on second sheeting piece 102 oppositely from first rail 114 and has a profile that is complementary to the profile of second rail 24 of panel 10.

Second side 122 also defines a second groove 126 that is located on second side 122 between first groove 124 and first edge 106. Second groove 126 extends from the third edge 110 to the fourth edge 112 and is located on second sheeting piece 102 oppositely from second rail 116. Second groove 126 is spaced apart from first groove 124 and oriented on second side 122 in a direction that is parallel to the direction of first groove 124 to define an overlap area 128 between first groove 124 and second groove 126. Second groove 126 has a profile that is complementary to the profile of first rail 22 of panel 10. As with the other rails and grooves that are disclosed herein, the profile of first groove 124 and second groove 126 and the profile of first rail 22 and second rail 24 is preferably in the form of a trapezoid as previously shown and described in connection with FIGS. 1, 3 and 3A.

First rail 22 and second rail 24 are spaced apart on side 12 of panel 10 by a dimension that is equivalent to the dimension by which second groove 126 is spaced apart from first groove 124 on the second side 122 of second sheeting piece 102. In this way, when second sheeting piece 102 is oriented on the roof frame with third edge 110 extending over eaves sheeting 82, fourth edge 112 the closest edge to the edge 70 of the roof cover and the first side 104 of second sheeting piece 102 facing upwardly, second sheeting piece 102 can be located over the adjacent panel 10 so that first rail 22 engages second groove 126, second rail 24 engages first groove 124, and overlap area 128 of second sheeting piece 102 opposes the overlap area 26 of the adjacent panel 10. In this way, second sheeting piece 102 securely engages with the adjacent panel 10 that is located at the end of the row in the array of panels 10.

To construct the second row of panels 10 in the array, another first sheeting piece 84 is secured to the roof frame above first sheeting piece 84 and in the same manner as for first sheeting piece 84 except that the third edge of first sheeting piece 84 is placed over the top portion of the first sheeting piece 84 in the first row instead of over the eaves sheeting 82. The second row of panels 10 is then added to the array in the same way as previously described for panels 10 and the second sheeting piece 102 in the first row except that the third edge 18 of each panel is placed over the top portion of the panel 10 in the corresponding column of the first row instead of over eaves sheeting 82. Similarly, the third edge 110 of the second sheeting piece 102 in the second row is placed over the top portion of the second sheeting piece 102 in the first row. In this way, the panel array of two rows and four columns of panels is quickly assembled.

Figure 6:
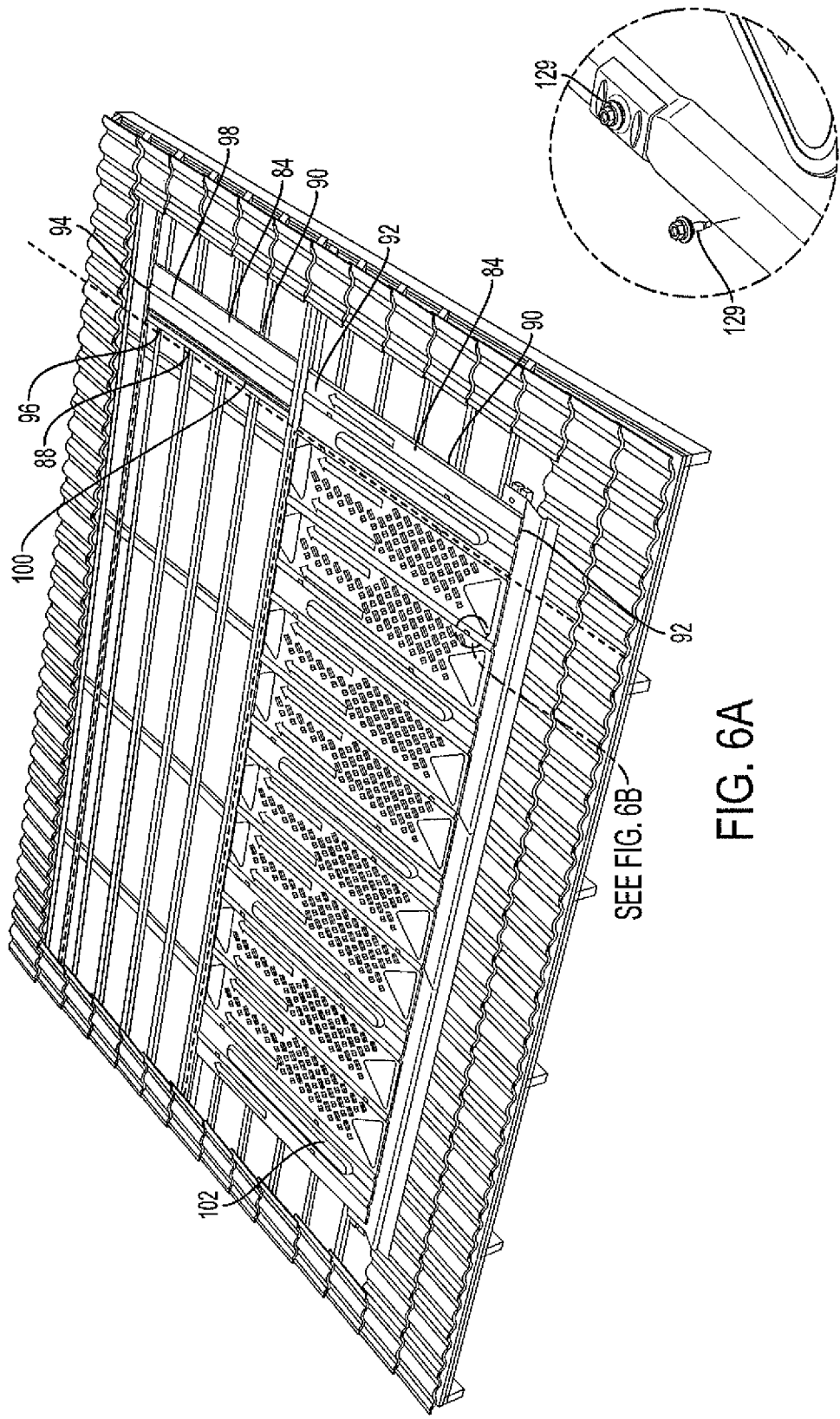
FIG. 6A is a perspective drawing of portions of the disclosed embodiment of the system for mounting a PV module array as shown in FIG. 5 and further including an additional sheeting piece.
FIG. 6B shows an enlarged portion of FIG. 6A.
Figure 7:
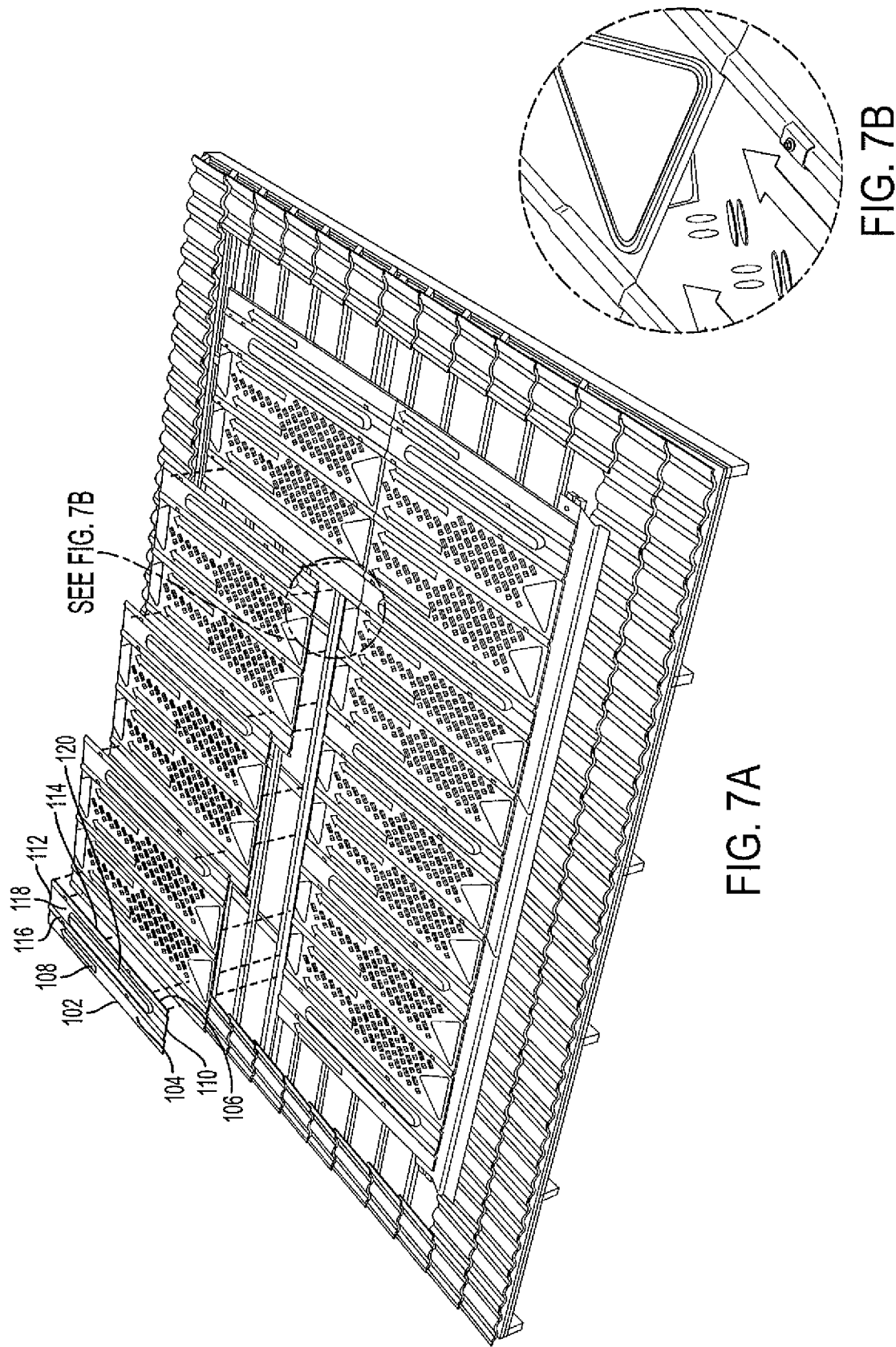
FIG. 7A is a perspective drawing of portions of the disclosed embodiment of the system for mounting a PV module array as shown in FIG. 6A and further including additional panels and an additional sheeting piece.
FIG. 7B shows an enlarged portion of FIG. 7A.

As the array of panels 10 is assembled, each of the panels 10 is secured to the roof support frame by fastening means 129 such as the screws shown in the enlarged portion of FIG. 6.

Figure 8:
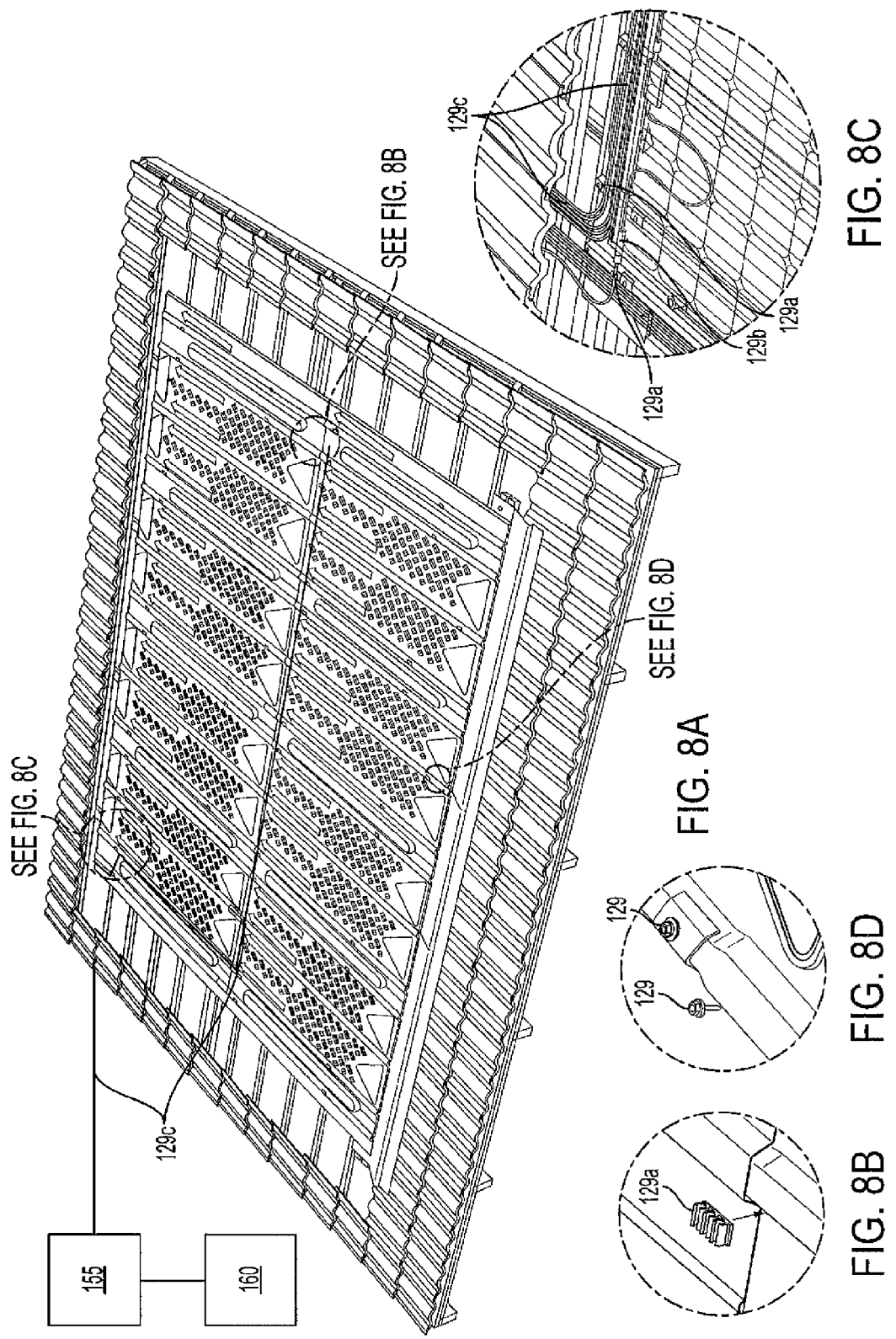
FIG. 8A is a perspective drawing of portions of the disclosed embodiment of the system for mounting a PV module array as shown in FIG. 7A.
FIG. 8B shows an enlarged portion of FIG. 8A.
FIG. 8C shows an enlarged portion of FIG. 8A.
FIG. 8D shows an enlarged portion of FIG. 8A.
Figure 9:
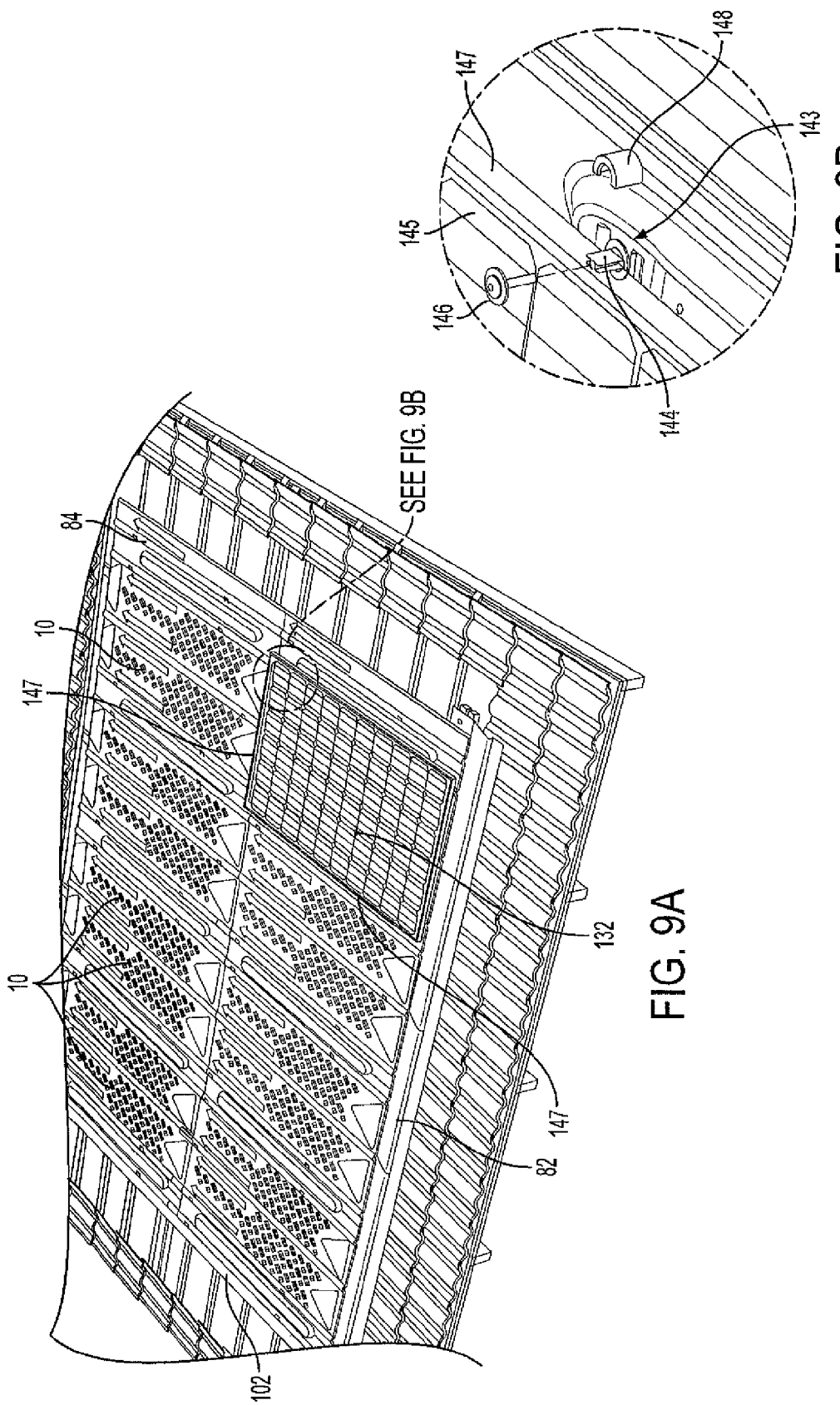
FIG. 9A is a perspective drawing of portions of the disclosed embodiment of the system for mounting a PV module array as shown in FIG. 8 and further including a PV module.
FIG. 9B shows an exploded perspective view of an enlarged portion of FIG. 9A showing details of a fastener.
Figure 10:
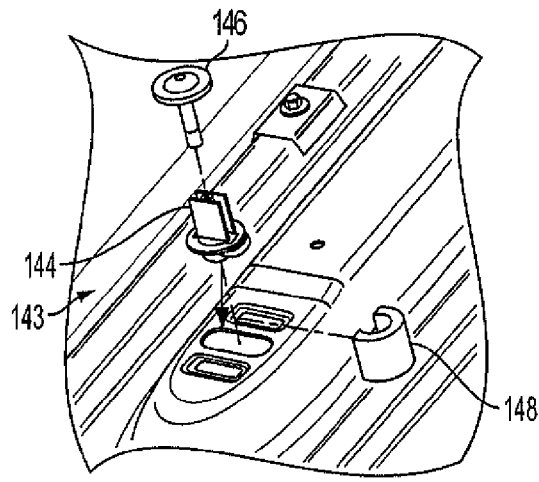
FIG. 10 is an exploded perspective view of the boss portion of a panel of the disclosed embodiment of the system for mounting a PV module array as shown in FIG. 9B and further disclosing details of the fastener.
Figure 11:
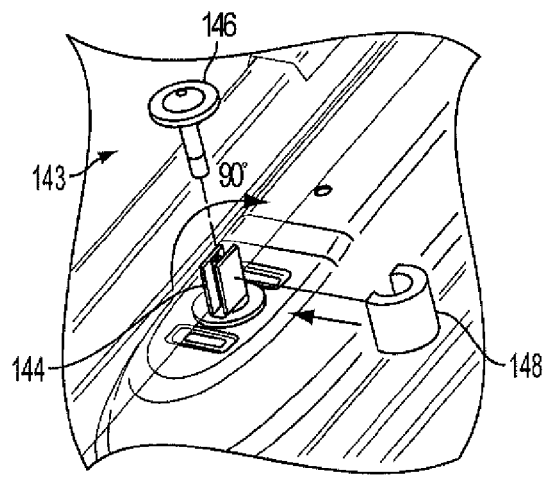
FIG. 11 is an exploded perspective view of the boss portion of a panel of the disclosed embodiment of the system for mounting a PV module array as shown in FIG. 9B and further disclosing details of the fastener shown in FIGS. 9B and 10.
Figure 12:
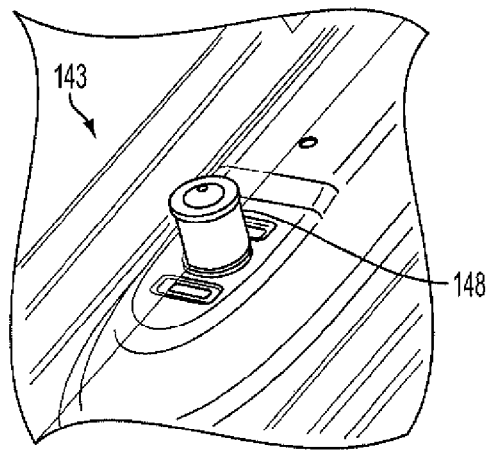
FIG. 12 is a perspective view of the boss portion of a panel of the disclosed embodiment of the system for mounting a PV module array as shown in FIG. 9B and further disclosing the fastener shown in FIGS. 9B, 10 and 11.
Figure 13A:
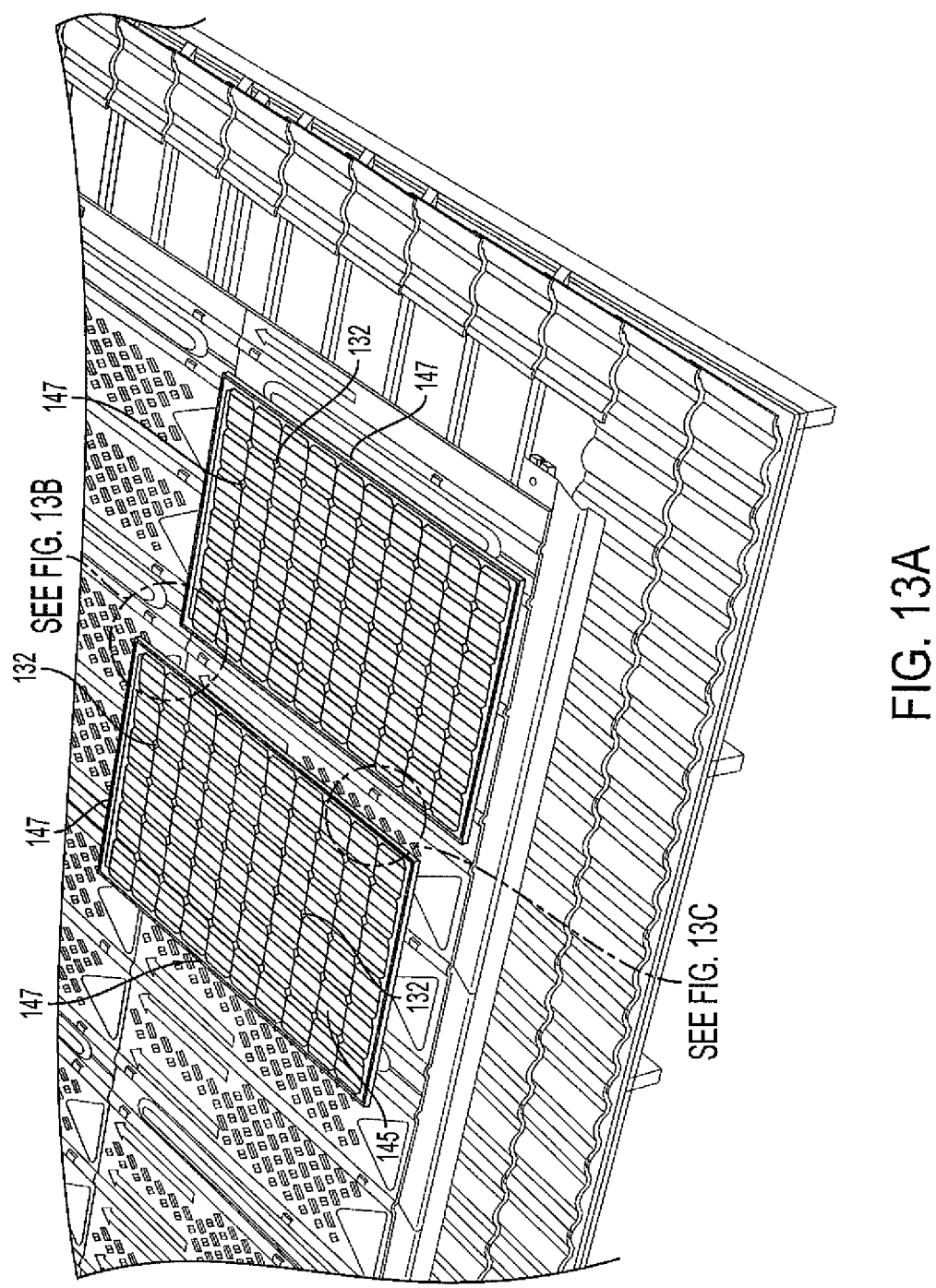
FIG. 13A is a partially exploded perspective view of the disclosed embodiment of the system for mounting a PV module array as shown in FIG. 9 and further including a second PV module.
Figure 13B:
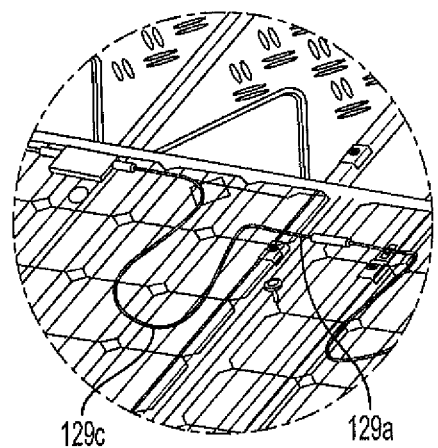
FIG. 13B shows an enlarged portion of FIG. 13A.
Figure 13C:
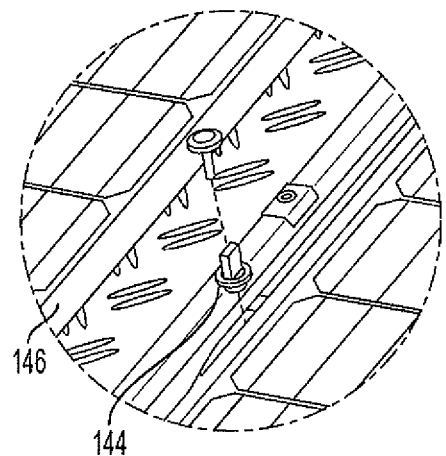
FIG. 13C shows an enlarged portion of FIG. 13A.
Figure 14:
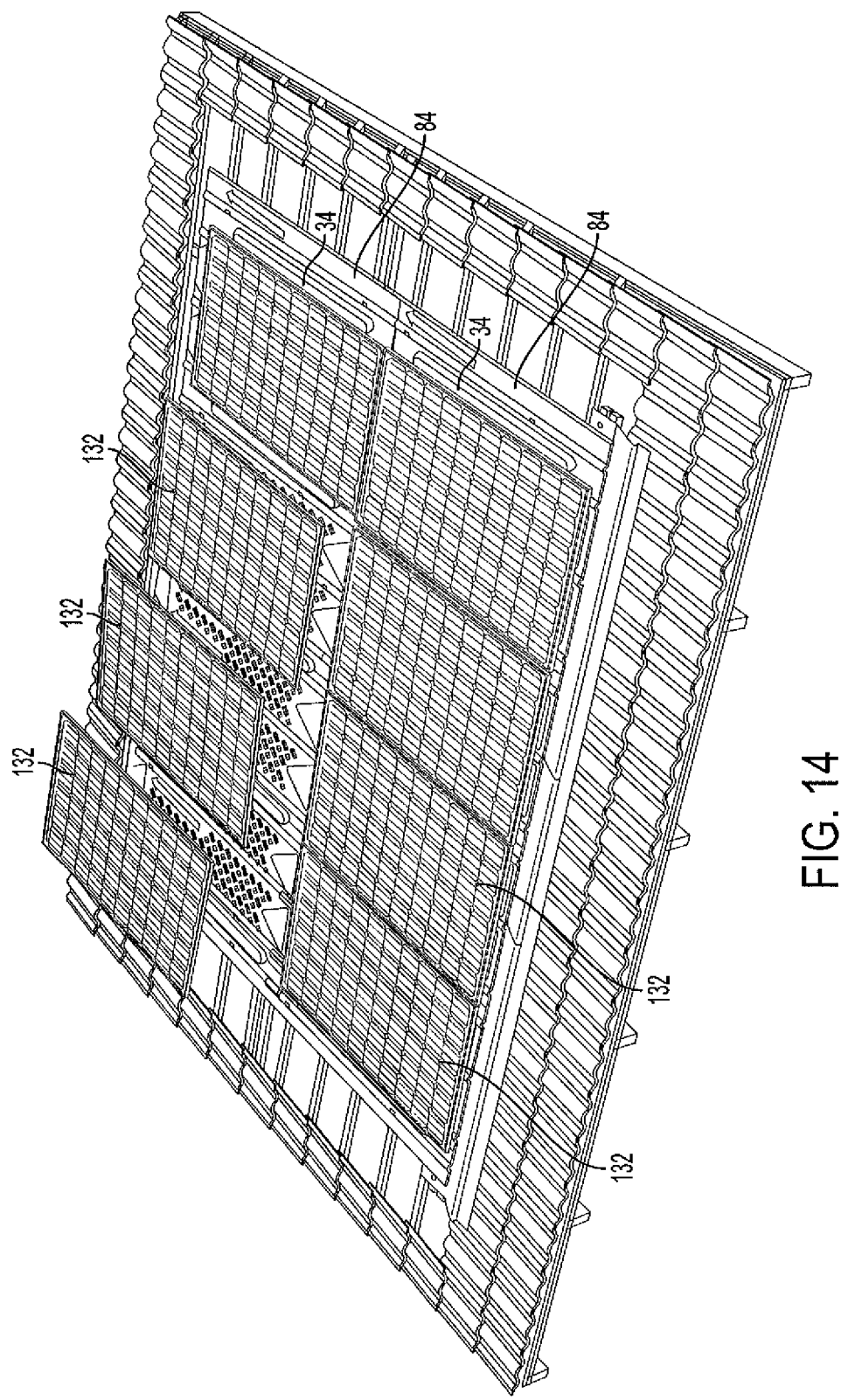
FIG. 14 is a partially exploded perspective view of the disclosed embodiment of the system for mounting a PV module array as shown in FIG. 13A and further including additional modules.

Also when the panel array of two rows and four columns is completed, the panel array can be prepared for electrically connecting the PV modules. FIGS. 8 and 13 show one layout of cable clips 129*a*, connectors 129*b*, and related wiring 129*c* that can be used for that purpose.

To mount the array of PV modules, a PV module 132 is placed on the support surface 42 of the boss 34 of respective panels 10 and the support surface 142 of the boss 120 of respective second sheeting pieces 102. More specifically, a PV module 132 is placed in a straddling position between support surfaces 42 on adjacent modules 10 so that a support surface 42 supports each side of the PV module 132. At the end of the row of panels 10, boss 34 on the last panel 10 in the row cooperates with the support surface 142 of the boss 120 of second sheeting piece 102 to support the end PV module 132. After PV modules 132 have been placed in the array at each panel 10 in the first row, the procedure for installing PV modules 132 in the first row is repeated to place the PV modules 132 in the second row.

The height $H^2$ of boss 34 and boss 120 determines the spacing between the PV module 132 and the first surface 12 of panel 10. By limiting the height of boss 34 and boss 120, the level of the PV module array above the conventional roof cover is also limited. In this way, the aesthetics of the PV module array is improved because the array blends more closely with the surrounding roof cover of the building. This is a significant improvement over prior art mounting systems that mount the PV modules substantially above the conventional roof cover.

At the same time, the presently disclosed design provides a substantial passageway for the flow of air between each of the PV modules 132 and its respective panel 10 notwithstanding that the mounting system not only supports the PV module array, but also affords an integral roof cover.

The PV modules 132 are secured to the respective bosses 34 and 120 by fastening means 143 such as shown in FIGS. 10-13. FIGS. 10-13 show a module clamp in which a spacer 144 is inserted into boss 34 or 120 through a hole in the boss. The spacer 144 is then secured to the boss by rotating the spacer by ninety degrees to engage a locking cam on spacer 144. A screw and washer assembly 146 is then turned into spacer 144 to engage the top surface 145 of the PV module 132 and maintain the module against boss 34 or 120. For spacers 144 and screw and washer assemblies 143 that are used on the outer perimeter 147 of the PV module array, a cap 148 is also provided for aesthetic purposes. When the spacers 144 and screw and washer assemblies 143 are used internally in the PV module array, no cap is used. However, the spacer 144 is still used to separate the PV modules 132 sufficiently from each other to protect against damage due to thermal expansion of the PV modules.

Figure 15:
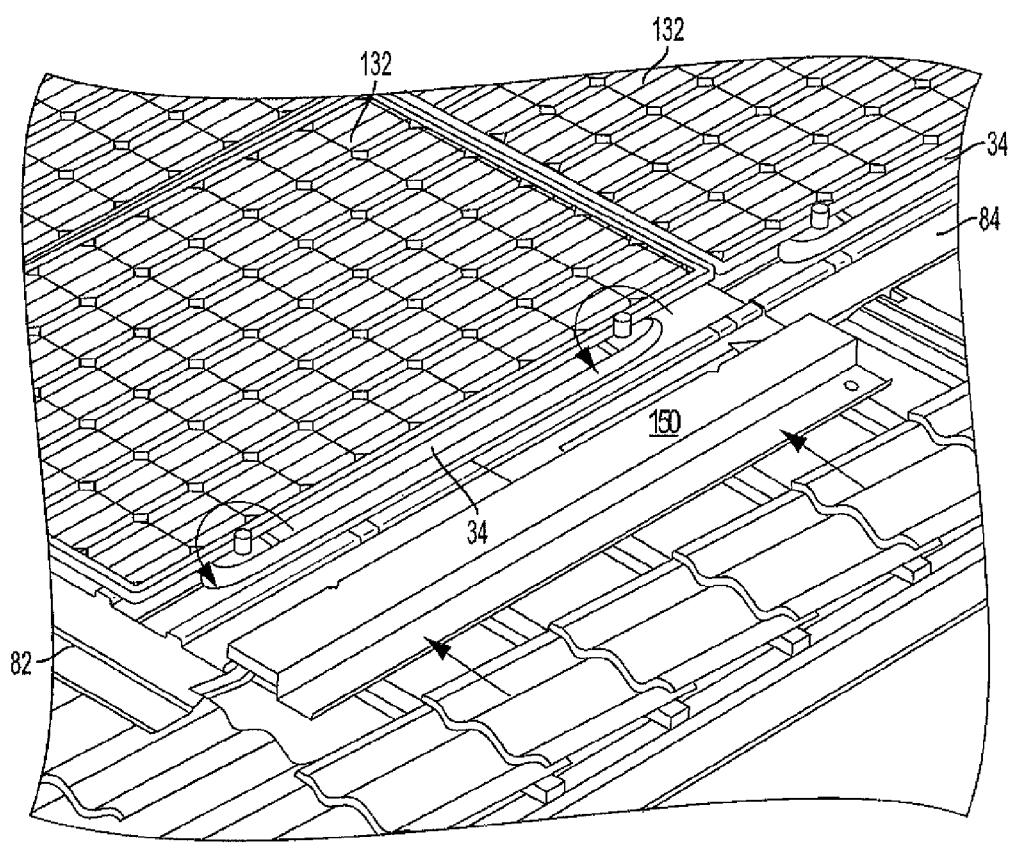
FIG. 15 is a perspective view of the disclosed embodiment of the system for mounting a PV module array as shown in FIG. 14 and further including a side cover.
Figure 16:
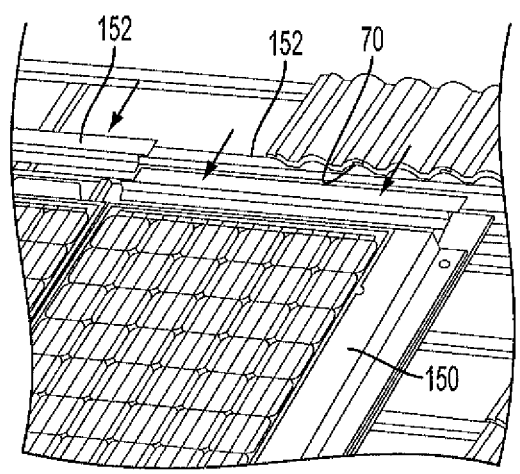
FIG. 16 is a partially exploded perspective view of the disclosed embodiment of the system for mounting a PV module array as shown in FIG. 14 and further including a ventilation grille.

For additional aesthetic reasons, the disclosed PV module mounting system can further include side covers 150. FIGS. 15 and 16 show side covers 150 that are placed over first sheeting piece 84 and second sheeting piece 102 to present a smooth, clean surface for side views of the PV module array.

As also shown in FIG. 16, the PV module array can further include a ventilation grille 152 that is attached to the uppermost row of PV modules 132.

Figure 17A:
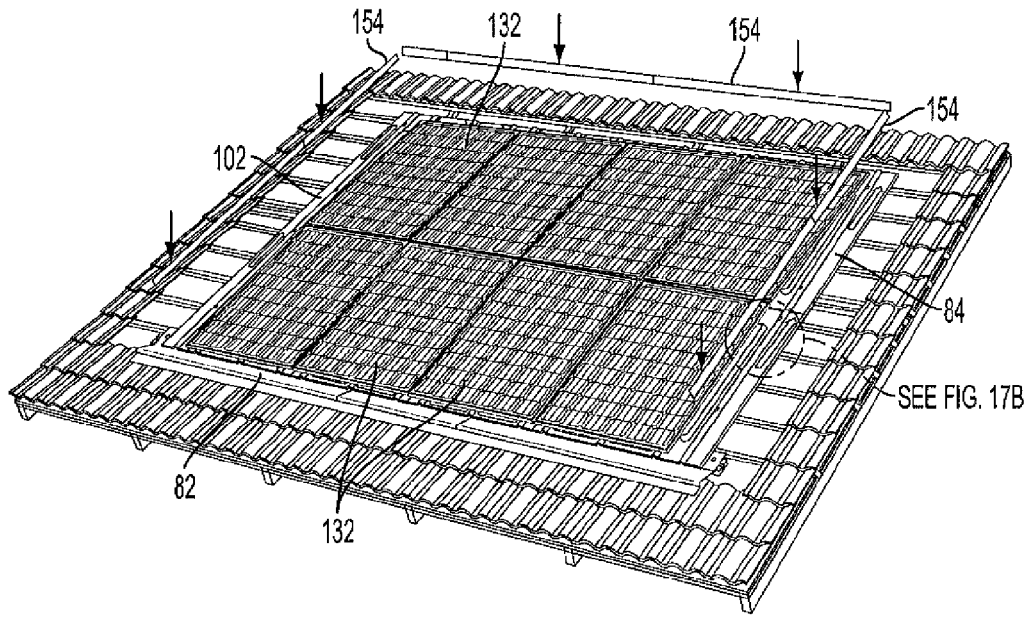
FIG. 17A is a partially exploded perspective view of the disclosed embodiment of the system for mounting a PV module array as shown in FIG. 14 and further including a foamed plastic wedge.
Figure 17B:
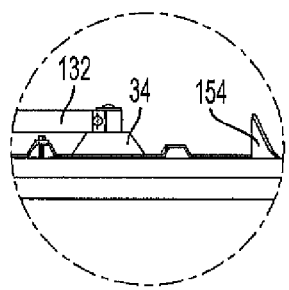
FIG. 17B shows an enlarged cross-section of a portion of FIG. 17A.

In addition, FIGS. 17 and 18 show a foam strip 154 that can be adhered to the perimeter of the PV module array. More specifically, foam strips 154 can be glued to the first side 12 of panel 10, the first side 86 of first sheeting piece 84, and first side 104 of second sheeting piece 102.

As also shown in FIG. 18, when the PV module array is completed, conventional roofing tiles can be tailored to fit sufficiently close to the array. Foam strip 154 is used to adjust the elevation of conventional tiles 65 that are adjacent the PV module array. In this way, the PV module array is blended with the conventional roof covering to improve the aesthetics of the disclosed PV module array.

The PV module array produces a DC electrical output that must be converted to an AC signal before the power can be used in the residence or transmitted to a commercial power grid. In one embodiment of the disclosed invention, DC/AC power conversion is accomplished for the PV module array in a central inverter that is located nearby, but remote from, the PV module array. Prior art central inverters used in combination with PV module arrays often included power optimization circuitry that improved the efficiency of the system. However, such central inverters tended to be disproportionately sensitive to losses and inefficiencies to individual modules. Thus, the efficiency of the entire system could be adversely affected if a single module was compromised due to shading or relative orientation.

To overcome the difficulties of central inverters, the presently disclosed system includes a power optimizer 155 to improve system efficiency. Power optimizer 155 is electrically connected to the PV module array. The output of power optimizer 155 is electrically connected to a central inverter 160. Power optimizer 155 is a DC to DC electrical network that tunes the performance of the system with circuitry that executes maximum power point tracking of multiple modules. Power optimizer 155 tunes the DC output of the PV modules to match the impedance of the central inverter. The power optimizer is especially helpful when there is wide variance of the power output from PV modules for reasons such as solar illumination losses due to shading, dirt and dust.

The panel system and installation that is shown and described in connection with FIGS. 1-18 can be similarly constructed using panels 55. The system and method when substituting panels 55 in place of panels 10 with the following exceptions. First, in addition to the structure of third overlap area 50 of panel 10, the third overlap area 50 of panel 55 further defines a cavity 156 that has the inverse shape of boss 64 of panel 10. Similarly, the overlap area 128 on the second side 122 of second sheeting piece 102 further defines a cavity 158 in the shape of the inverse of boss 120. Although cavities 156 and 158 are not necessary to the function of the system as described in connection with panel 10, that system functions equally well with the cavities and cavities 156 and 158 are shown in FIG. 3.

In addition, another change from the system of FIGS. 1-18 when panel 55 is substituted for panel 10 is that the first sheeting piece 84 is not used. Instead another second sheeting piece 102 replaces the first sheeting piece 84. The alternative second sheeting piece 102 is secured to the building frame in the opposite orientation of the second sheeting piece 102 that is shown in the system of FIGS. 1-18. Namely, the third edge 110 is the edge nearest the edge 70 of the roof cover, fourth edge 112 is nearest the edge 74 of the roof cover, first edge 106 is nearest the edge 72 of the roof cover, and second edge 108 is nearest the edge 76 of the roof cover.

With alternative second sheeting piece 102 positioned as described above, the disclosed system using panels 55 functions in the manner of the system with panels 10 except that boss 34 and boss 120 are double stacked. That is, as the panels 55 and second sheeting pieces 102 components are assembled to form the system, one boss is always received inside another boss. The result is that the support for the PV modules 132 is further strengthened because the mechanical strength of bosses 34 and 120 is increased due to the double stacking arrangement. This alternative system has the advantage of being mechanically stronger while also requiring fewer parts because first sheeting piece 84 is not used.

From the forgoing description, other embodiments of the invention that is herein disclosed also will become apparent to those skilled in the art. Such embodiments are also included within the scope of the following claims.

We claim:

1. A panel for use in supporting a solar module, said panel comprising: (a) a first side that is defined between first and second edges that are oppositely disposed from each other with said first side located between said first and second edges, said first side also being defined between third and fourth edges that are oppositely disposed from each other with said first side located between the third and fourth edges, said first side comprising:
a first rail that is located on said first side adjacent to said first edge, said first rail extending from said third edge to said fourth edge;
a second rail that is located on said first side between said first rail and said second edge, said second rail extending from said third edge to said fourth edge, said second rail being spaced apart from said first rail to define a first overlap area between said first rail and said second rail;
a third rail that is located on said first side adjacent to said second edge, said third rail extending from said third edge to said fourth edge;
a fourth rail that is located on said first side between said third rail and said second rail, said fourth rail extending from said third edge to said fourth edge, said fourth rail being spaced apart from said third rail to define a second overlap area between said third rail and said fourth rail;
a boss that is located on said first side and between said third rail and said fourth rail and between said third edge and said fourth edge, said boss not extending from said third edge to said fourth edge, said boss having a longitudinal dimension between said third and fourth edges and a lateral dimension between said third rail and said fourth rail, said longitudinal dimension being greater than said lateral dimension, said boss defining a support surface for the vertical support of said solar module; and
(b) a second side that is oppositely disposed on said panel from said first side, said second side being defined between said first and second edges and located between said first and second edges, said second side also being defined between said third and fourth edges and located between said third and fourth edges, said second side comprising:
a first groove that is located on said second side adjacent to said second edge, said first groove extending from said third edge to said fourth edge and being located on said panel oppositely from said third rail, said first groove having a profile that is complementary to the profile of said third rail;
and a second groove that is located on said second side between said first groove and said first edge, said second groove extending from said third edge to said fourth edge and being located on said panel oppositely from said fourth rail, said second groove being spaced apart from said first groove to define a third overlap area between said first groove and said second groove, said second groove having a profile that is complementary to the profile of said fourth rail.

2. The panel of claim 1 wherein said panel cooperates with a solar module that is supported on the support surface of said boss to define an air passage between said module and said panel at times when said solar module is mounted on said panel.

3. The panel of claim 2 wherein said air passage between said module and said panel is further defined by said boss.

4. The panel of claim 1 further comprising a fifth rail that is located on the first side of said panel and between said second rail and said fourth rail, said fifth rail extending between said third and fourth edge.

5. The panel of claim 4 wherein said fifth rail includes a metal component to mechanically strengthen the panel between the third edge and the fourth edge.

6. The panel of claim 1 wherein the height of each of said rails is the dimension between the plane of the first side of said panel adjacent to the respective rail and the part of said respective rail that is furthest apart from said plane when measured in the direction normal to said plane.

7. The panel of claim 6 wherein the height of said boss is the dimension between the plane of the first side of aid panel adjacent to the boss and the part of said boss that is furthest apart from said plane when measured in the direction normal to said plane.

8. The panel of claim 7 wherein the height of said boss is greater than the height of each of said rails.

9. The panel of claim 1 further comprising:
a second boss that is located on said first side and between said first rail and said second rail and between said third edge and said fourth edge, said boss having a longitudinal dimension between said third and fourth edges and a lateral dimension between said first rail and said second rail, said boss defining a support surface for the vertical support of said solar module.

10. The panel of claim 1 further comprising:
an electrical micro-inverter that is mechanically secured to the first side of said module between the second rail and the fourth rail, said electrical micro-inverter also being electrically connectable to a solar module at times when the module is supported by the boss of said first side of said panel.

11. A system for providing a roof cover and for supporting an array of solar modules, said system comprising:
(a) a first panel having:
a first side that is defined between first and second edges that are oppositely disposed from each other with said first side located between said first and second edges, said first side also being defined between third and fourth edges that are oppositely disposed from each other with said first side located between the third and fourth edges, said first side comprising:
a first rail that is located on said first side adjacent to said first edge, said first rail extending from said third edge to said fourth edge;
a second rail that is located on said first side between said first rail and said second edge, said second rail extending from said third edge to said fourth edge, said second rail being spaced apart from said first rail to define a first overlap area between said first rail and said second rail;
and a boss that is located on said first side of said first panel between said second rail and said second edge, and between said third edge and said fourth edge, said boss not extending from said third edge to said fourth edge, said boss having a longitudinal dimension between said third and fourth edges and a lateral dimension between said first and second edges, said longitudinal dimension being greater than said lateral dimension, said boss defining a support surface for the vertical support of said array of solar modules; and
(b) a second panel having:
a first side that is defined between first and second edges that are oppositely disposed from each other with said first side located between said first and second edges, said first side also being defined between third and fourth edges that are oppositely disposed from each other with said first side located between the third and fourth edges, said first side comprising:
a boss that is located on said first side between said third edge and said fourth edge, said boss not extending from said third edge to said fourth edge, said boss having a longitudinal dimension between said third and fourth edges and a lateral dimension between said first and second edges, said longitudinal dimension being greater than said lateral dimension, said boss defining a support surface for the vertical support of said array of solar modules; and
a second side that is oppositely disposed on said panel from said first side, said second side being defined between said first and second edges and located between said first and second edges, said second side also being defined between said third and fourth edges and located between said third and fourth edges, said second side comprising:
a first groove that is located on said second side adjacent to said second edge, said first groove extending from said third edge to said fourth edge, said first groove being located on the second side of said second panel at a location that is between the boss and said second edge, said first groove having a profile that is complementary to the profile of the second rail of said first panel such that the second rail of said first panel can be received in the first groove of said second panel by translational movement of said second rail of said first panel into the first groove of said second panel; and
a second groove that is located on said second side of said second panel between said first groove and said first edge of said second panel, said second groove extending from said third edge to said fourth edge of said second panel, said second groove being spaced apart from said first groove to define an overlap area between said first groove and said second groove, said second groove being located on said second side of said second panel at a location that is opposite from the first side of said second panel and between the boss and said first edge, said second groove having a profile that is complementary to the profile of said first rail of said first panel such that the first rail of said first panel can be received in the second groove of said second panel by translational movement of said first rail of said first panel into the second groove of said second panel;
such that the first and second rails of the first panel engage the first and second grooves of the second panel by moving said first and second panels together in a translational movement, and the boss of said first panel is positioned with respect to the boss of said second panel to support said array of solar modules.

12. The panel system of claim 11, said system further comprising:
a first solar module that is supported on a first portion of the support surface of said second panel; and
a second solar module that is support on a second portion of the support surface of said second panel with one side of said first solar module opposing one side of said second solar module.

13. The panel system of claim 12 wherein said first and second panels are arranged in one row of a two-dimensional array of panels, said system further comprising:
a third panel having:
a first side that is defined between first and second edges that are oppositely disposed from each other with said first side located between said first and second edges, said first side also being defined between third and fourth edges that are oppositely disposed from each other with said first side located between the third and fourth edges, said first side comprising:
a first rail that is located on said first side adjacent to said first edge, said first rail extending from said third edge to said fourth edge; and
a second rail that is located on said first side between said first rail and said second edge, said second rail extending from said third edge to said fourth edge, said second rail being spaced apart from said first rail to define a first overlap area between said first rail and said second rail; and
a fourth panel having:
a first side that is defined between first and second edges that are oppositely disposed from each other with said first side located between said first and second edges, said first side also being defined between third and fourth edges that are oppositely disposed from each other with said first side located between the third and fourth edges;

a second side that is oppositely disposed on said panel from said first side, said second side being defined between said first and second edges and located between said first and second edges, said second side also being defined between said third and fourth edges and located between said third and fourth edges, said second side comprising:
  a first groove that is located on said second side adjacent to said second edge, said first groove extending from said third edge to said fourth edge, said first groove being located on the second side of said second panel at a location that is between the boss and said second edge, said first groove having a profile that is complementary to the profile of the second rail of said first panel such that the second rail of said first panel can be received in the first groove of said second panel by translational movement of said second rail of said first panel into the first groove of said second panel; and
a third solar module that is supported on a first portion of the support surface of the boss of said second panel; and
a fourth solar module that is supported on a second portion of the support surface of the boss of said second panel with one side of said third solar module opposing a second side of said first solar module and one side of said fourth solar module opposing a second side of said second solar module.

14. The system of claim 13 wherein a second side of said third solar module opposes a second side of said fourth solar module.

15. The panel system of claim 14 wherein a plurality of solar modules is supported by the same plurality of panels and said panels are arranged in an array of rows and columns.

16. The panel system of claim 15 wherein said panels are arrayed in more than one column and more than one row with the top panel of each column defining the top of the array and the bottom panel of each column defining the bottom of the array, and each end of a row of panels defining a respective side of said array, and whenever the fourth edge of each panel in a row overlaps the third edge of a panel in the same column and any next lower row.

17. The panel system of claim 16 wherein one of the first and second edges of each panel in a given row overlaps the other of said first and second edges of a panel that is in the same row and that is also in an adjacent column.

18. The panel system of claim 16 wherein the panels in a given column cooperate with solar modules in the same column to define a passageway for air that flows in the direction from the bottom of said column to the top of said column.

19. The panel system of claim 16 further comprising:
a row of eaves sheeting that is located below the lowest row of panels, said eaves sheeting bridging between the third edge of the lowest row of panels and the roof cover.

20. The panel system of claim 16 further comprising:
a compressible wedge that is secured to the first side of said row of panels that is located at the top of said array.

21. The panel system of claim 16 further comprising:
fasteners that maintain at least one side of each solar module against a respective boss.

22. The panel system of claim 21 wherein said fasteners include a spacer for spacing adjacent solar panels apart from each other.

23. The panel system of claim 16 further comprising:
a column of sheeting pieces that is located on one side of said panel array, each member of said column being a sheeting piece that includes:
  (a) a first side that is defined between first and second edges that are oppositely disposed from each other with said first side located between said first and second edges, said first side also being defined between third and fourth edges that are oppositely disposed from each other with said first side located between the third and fourth edges, said first side comprising:
    a boss that is located on said first side between said third edge and said fourth edge, said boss having a longitudinal dimension between said third and fourth edges and a lateral dimension between said first and second sides, with said longitudinal dimension being greater than said lateral dimension, said boss defining a support surface for the vertical support of one of said solar modules; and
  (b) a second side that is oppositely disposed on said sheeting piece from said first side, said second side being defined between said first and second edges and located between said first and second edges, said second side also being defined between said third and fourth edges and located between said third and fourth edges, said second side comprising:
    a first groove that is located on said second side adjacent to said second edge, said first groove extending from said third edge to said fourth edge, said first groove being located on the second side of said sheeting piece at a location that is opposite from an area of the first side of said sheeting piece that is between the boss and said second edge, said first groove having a profile that is complementary to the profile of the second rail of the adjacent panel in the same row such that the second rail of said panel in the same row is received in the first groove of said sheeting piece by translational movement of said second rail of said panel into the first groove of said sheeting piece; and
    a second groove that is located on said second side of said sheeting piece between said first groove and said first edge of said sheeting piece, said second groove extending from said third edge to said fourth edge of said sheeting piece, said second groove being spaced apart from said first groove to define an overlap area between said first groove and said second groove, said second groove being located on said second side of said sheeting piece at a location that is opposite from an area of the first side of said sheeting piece that is between the boss and said first edge, said second groove having a profile that is complementary to the profile of said first rail of said panel such that the first rail of said panel can be received in the second groove of said sheeting piece by translational movement of said first rail of said panel into the second groove of said sheeting piece;
such that the first and second rails of the panel engage the second and first grooves of the sheeting piece by moving said sheeting piece and said panel together in a translational movement, and the boss of said panel is positioned with respect to the boss of said sheeting piece to support the solar module at the edge of the array and in the same row as the panel.

24. The panel system of claim 23 further comprising:
a compressible wedge that is secured to the first side of said column of sheeting pieces that is located on a side of the array.

25. The panel system of claim 12 wherein adjacent panels in the same row are secured together by fasteners.

26. The panel system of claim 11 wherein said panel system provides a DC electrical output, said system further comprising:

a power optimizer that is electrically connected to the electrical output of the panel system, said power optimizer providing maximum power point tracking for multiple PV modules in said panel system.

27. The panel system of claim 11 wherein each of said panels further comprises:

an electrical micro-inverter that is mechanically secured to the first side of said module between the second rail and the fourth rail, said electrical micro-inverter also being electrically connectable to a solar module at times when the module is supported by the boss of said first side of said panel.

28. A panel for use in mechanically supporting and electrically connecting to a solar module, said panel comprising:

(a) a first side that is defined between first and second edges that are oppositely disposed from each other with said first side located between said first and second edges, said first side also being defined between third and fourth edges that are oppositely disposed from each other with said first side located between the third and fourth edges, said first side comprising:

a first rail that is located on said first side adjacent to said first edge, said first rail extending from said third edge to said fourth edge;

a second rail that is located on said first side between said first rail and said second edge, said second rail extending from said third edge to said fourth edge, said second rail being spaced apart from said first rail to define a first overlap area between said first rail and said second rail;

a third rail that is located on said first side adjacent to said second edge, said third rail extending from said third edge to said fourth edge;

a fourth rail that is located on said first side between said third rail and said second rail, said fourth rail extending from said third edge to said fourth edge, said fourth rail being spaced apart from said third rail to define a second overlap area between said third rail and said fourth rail;

a boss that is located on said first side and between said third rail and said fourth rail and between said third edge and said fourth edge, said boss not extending from said third edge to said fourth edge, said boss having a longitudinal dimension between said third and fourth edges a lateral dimension between said third rail and said fourth rail, said longitudinal dimension being greater than said lateral dimension, said boss defining a support surface for the vertical support of said solar module;

(b) a second side that is oppositely disposed on said panel from said first side, said second side being defined between said first and second edges and located between said first and second edges, said second side also being defined between said third and fourth edges and located between said third and fourth edges, said second side comprising:

a first groove that is located on said second side adjacent to said second edge, said first groove extending from said third edge to said fourth edge and being located on said panel oppositely from said third rail, said first groove having a profile that is complementary to the profile of said third rail; and a second groove that is located on said second side between said first groove and said first edge, said second groove extending from said third edge to said fourth edge and being located on said panel oppositely from said fourth rail, said second groove being spaced apart from said first groove to define a third overlap area between said first groove and said second groove, said second groove having a profile that is complementary to the profile of said fourth rail; and (c) an electrical micro-inverter that is mechanically secured to the first side of said module between the second rail and the fourth rail, said electrical micro-inverter also being electrically connectable to the solar module at times when the solar module is supported by the boss of said first side.

\* \* \* \* \*